(12) United States Patent
Watanabe

(10) Patent No.: US 11,821,873 B2
(45) Date of Patent: Nov. 21, 2023

(54) ULTRASOUND FLAW DETECTOR, ULTRASOUND FLAW DETECTION METHOD, AND PROGRAM

(71) Applicant: Konica Minolta Inc., Tokyo (JP)

(72) Inventor: Yasuhito Watanabe, Takatsuki (JP)

(73) Assignee: Konica Minolta, Inc., Tokyo (JP)

( * ) Notice: Subject to any disclaimer, the term of this patent is extended or adjusted under 35 U.S.C. 154(b) by 278 days.

(21) Appl. No.: 17/320,730

(22) Filed: May 14, 2021

(65) Prior Publication Data

US 2022/0003718 A1 Jan. 6, 2022

(30) Foreign Application Priority Data

Jul. 3, 2020 (JP) ................................. 2020-115544

(51) Int. Cl.
*G01N 29/07* (2006.01)
*G01N 29/28* (2006.01)
(Continued)

(52) U.S. Cl.
CPC .......... *G01N 29/07* (2013.01); *G01N 29/223* (2013.01); *G01N 29/2437* (2013.01);
(Continued)

(58) Field of Classification Search
CPC .. G01N 29/07; G01N 29/223; G01N 29/2437; G01N 29/28; G01N 29/221;
(Continued)

(56) References Cited

U.S. PATENT DOCUMENTS 6,736,779 B1 * 5/2004 Sano .................... A61B 8/4494
600/447
7,757,559 B2 * 7/2010 Venczel ................. G01N 29/04
73/622
(Continued)

FOREIGN PATENT DOCUMENTS

JP 2001-249116 A 9/2001
JP 2008298454 A 12/2008
(Continued)

OTHER PUBLICATIONS

Japanese Office Action (JPOA) dated Sep. 26, 2023 issued for Japanese Patent Application No. 2020-115544 and its English translation.

Primary Examiner — Jacques M Saint Surin
(74) Attorney, Agent, or Firm — Rankin, Hill & Clark LLP

(57) ABSTRACT

An ultrasound flaw detector includes: an ultrasound probe that is provided with a plurality of transducers and that is held so that a direction in which the transducers are arrayed is parallel to a surface of the test object in a state where the plurality of transducers is located in the liquid; a hardware processor that, using the plurality of transducers, transmits an ultrasound beam in a first direction with a predetermined angle with respect to a normal direction of the surface of the test object and receives a reflected ultrasound wave reflected by the test object; and an ultrasound signal processor that specifies a flaw of the test object on the basis of a reception signal that has been generated by the hardware processor on the basis of the reflected ultrasound wave.

12 Claims, 13 Drawing Sheets

(51) Int. Cl.
  *G01N 29/24* (2006.01)
  *G01N 29/22* (2006.01)

(52) U.S. Cl.
  CPC ....... *G01N 29/28* (2013.01); *G01N 2291/011* (2013.01); *G01N 2291/023* (2013.01); *G01N 2291/044* (2013.01); *G01N 2291/106* (2013.01)

(58) Field of Classification Search
  CPC .. G01N 29/225; G01N 29/265; G01N 29/043; G01N 2291/023; G01N 2291/044; G01N 2291/011; G01N 2291/106
  USPC .......................................................... 73/598
  See application file for complete search history.

(56) References Cited

U.S. PATENT DOCUMENTS 10,756,345 B2 * 8/2020 Beidaghi ............. H01M 10/054
10,874,375 B2 * 12/2020 Katsuyama ............ A61B 6/469
10,918,355 B2 * 2/2021 Katsuyama .......... A61B 8/4444

FOREIGN PATENT DOCUMENTS

| JP | 2011247676 A | 12/2011 |
| JP | 2013-88240 A | 5/2013 |
| JP | 2014-232044 A | 12/2014 |
| WO | WO2014007023 A1 | 6/2016 |

\* cited by examiner

ULTRASOUND FLAW DETECTOR, ULTRASOUND FLAW DETECTION METHOD, AND PROGRAM

The entire disclosure of Japanese patent Application No. 2020-115544, filed on Jul. 3, 2020, is incorporated herein by reference in its entirety.

BACKGROUND

Technological Field

The present disclosure relates to an ultrasound flaw detector and an ultrasound flaw detection method, and more particularly to a method of treating reflected ultrasound waves.

Description of the Related Art

An ultrasound flaw detection method is used as a nondestructive inspection of structures. It is widely used particularly for the purpose of detecting defects around a welded part of a welded structure or defects on the surface or inside of an integrally molded structure, because it does not need a large-scale accessory device such as shielding as compared with radiographic testing.

When inspection is carried out for a test object having a fixed shape, an ultrasound probe (probe) having a shape capable of being in close contact with the test object is used (for example, see JP 2014-232044 A, JP 2013-88240 A, and JP 2001-249116 A). The disclosed ultrasound probes are provided with a transducer for transmission and a transducer for reception, and can transmit and receive ultrasound waves suitable for the structure of the test object. On the other hand, these ultrasound probes are unsuitable for testing a test object having a complicated shape, such as an object formed by welding members of different shapes, an object formed by integrally molding a composite material such as carbon fiber reinforced plastics (CFRP) or light metal by casting (casting process), etc., because it is impossible to bring them into direct and close contact with such test object. Therefore, in order to test such test object, a method including immersing the test object in a liquid such as water and placing an ultrasound probe provided with a plurality of transducers in the liquid to transmit and receive ultrasound wave via the liquid is used.

However, in the method in which the test object is immersed in the liquid, the quality of a reception signal is not sufficiently improved depending on the relationship between the surface of the test object and the irradiation direction of an ultrasound beam from the ultrasound probe. Particularly when the ultrasound beam is emitted in a direction perpendicular to the surface of the test object, the quality of the reception signal may not be sufficient.

SUMMARY

In view of the above problems, an object of an aspect of the present disclosure is to improve the quality of a reception signal in a method in which a test object is immersed in a liquid.

To achieve the abovementioned object, according to an aspect of the present invention, there is provided an ultrasound flaw detector that determines a flaw in a test object in a liquid using an ultrasound probe, and the ultrasound flaw detector reflecting one aspect of the present invention comprises: an ultrasound probe that is provided with a plurality of transducers and that is held so that a direction in which the transducers are arrayed is parallel to a surface of the test object in a state where the plurality of transducers is located in the liquid; a hardware processor that, using the plurality of transducers, transmits an ultrasound beam in a first direction with a predetermined angle with respect to a normal direction of the surface of the test object and receives a reflected ultrasound wave reflected by the test object; and an ultrasound signal processor that specifies a flaw of the test object on the basis of a reception signal that has been generated by the hardware processor on the basis of the reflected ultrasound wave.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Background of Mode for Carrying Out the Invention

The inventor has conducted various studies in order to improve the quality of a reception signal when an ultrasound probe having a plurality of transducers is used in the method in which the test object is immersed in a liquid.

Methods for improving the quality of a reception signal include shortening the total propagation distance of ultrasound wave and installing a reception transducer in a place where the signal intensity of the reflected ultrasound wave is high. In order to shorten the total propagation distance of ultrasound wave in the method in which the test object is immersed in a liquid, it is preferable that the transducer surface of the ultrasound probe and the surface of the test object are close to each other. Further, in order to install the reception transducer in a place where the signal intensity of the reflected ultrasound wave is high by using an ultrasound probe having a transducer array for both transmission and reception, it is preferable to transmit an ultrasound beam in a direction perpendicular to the surface of the test object and receive reflected ultrasound wave. However, the inventor has found a problem that, in this configuration, an S/N ratio is rather lowered because a noise component is high.

Figure 4A:
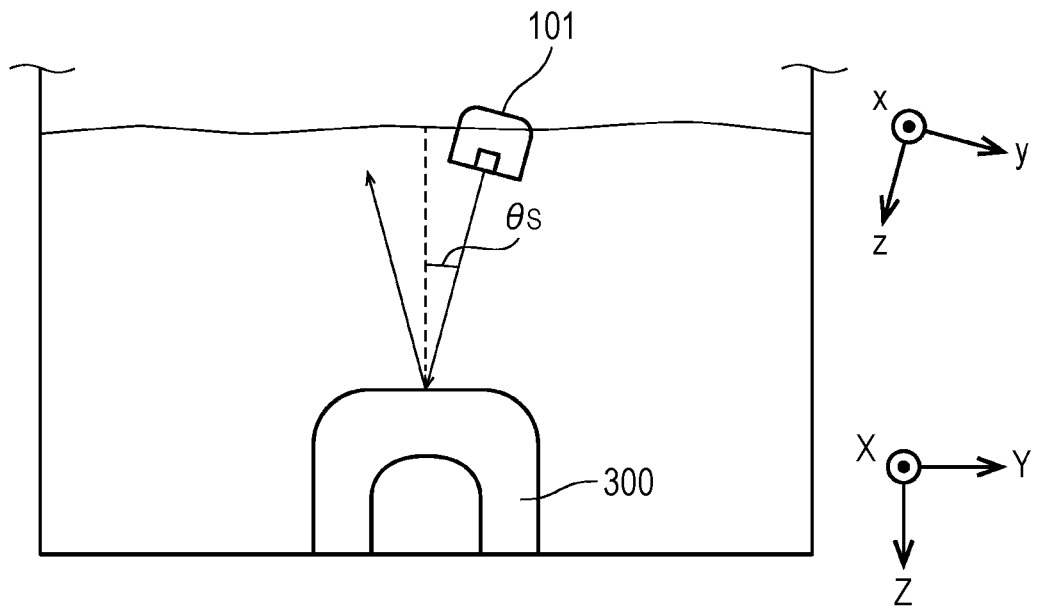
FIGS. 4A and 4B are schematic diagrams for describing multiple reflection of ultrasound waves between the probe and the test object according to the embodiment and the comparative example.
Figure 4B:
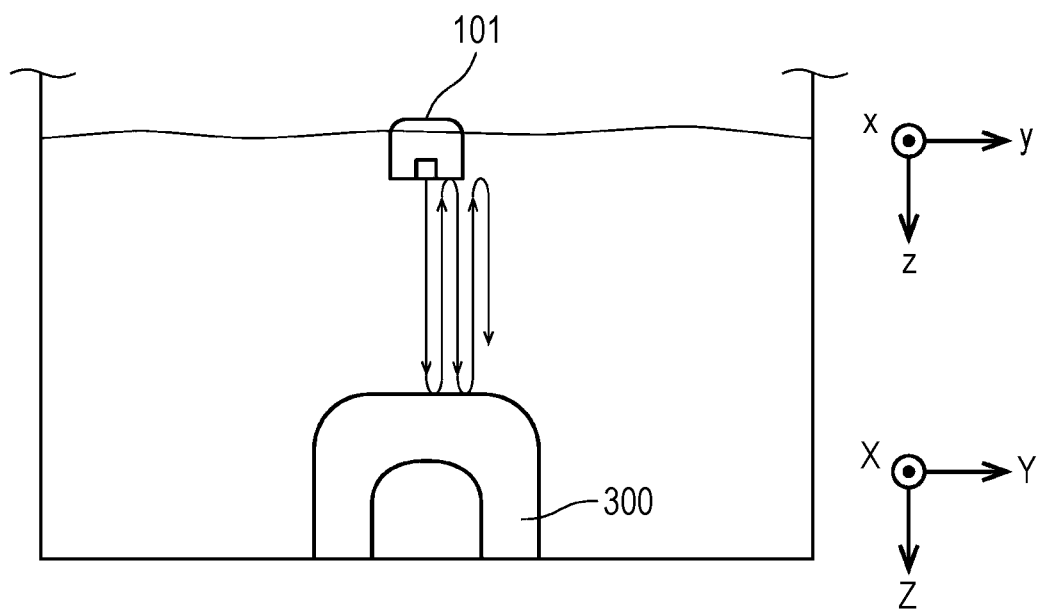

FIGS. 4A and 4B are schematic diagrams showing a relationship between the short axis of an ultrasound probe provided with transducers arrayed in one direction and the surface of a test object, and a state of reflection of ultrasound beam on the surface of the test object. Note that the long axis direction of the ultrasound probe indicates the direction in which the ultrasound transducers are arrayed on the transducer surface of the ultrasound probe, and the short axis direction indicates a direction perpendicular to the long axis direction on the transducer surface of the ultrasound probe. FIG. 4B shows a state in which ultrasound wave is transmitted in a direction (z direction, Z direction) perpendicular to the transducer surface (xy plane) of the ultrasound probe and the surface (XY plane) of the test object with the transducer surface and the surface of the test object facing each other in parallel. In this case, the interface between the test object and the liquid is perpendicular to the direction of travel of the ultrasound beam, and therefore, the reflected ultrasound wave from the surface of the test object propagates mainly in the direction opposite to the direction of travel of the ultrasound beam. Therefore, the signal intensity of the reflected ultrasound wave from the surface of the test object increases. On the other hand, reflection of ultrasound wave occurs on the transducer surface of the ultrasound probe, because there is a difference in refractive index between the transducer surface of the ultrasound probe and the liquid. At this time, the direction of travel of the reflected ultrasound wave is perpendicular to the transducer surface, and thus, the reflected wave from the transducer surface travels mainly in a direction perpendicular to the transducer surface, that is, in the initial direction of travel of the ultrasound beam (z direction, Z direction). Furthermore, since the similar reflection occurs on the surface of the test object, "multiple reflection" in which ultrasound waves reciprocate while being reflected many times between the transducer surface of the ultrasound probe and the surface of the test object occurs. Therefore, in an ultrasound image, a virtual image (artifact) of the surface of the test object is generated inside the test object.

Figure 5A:
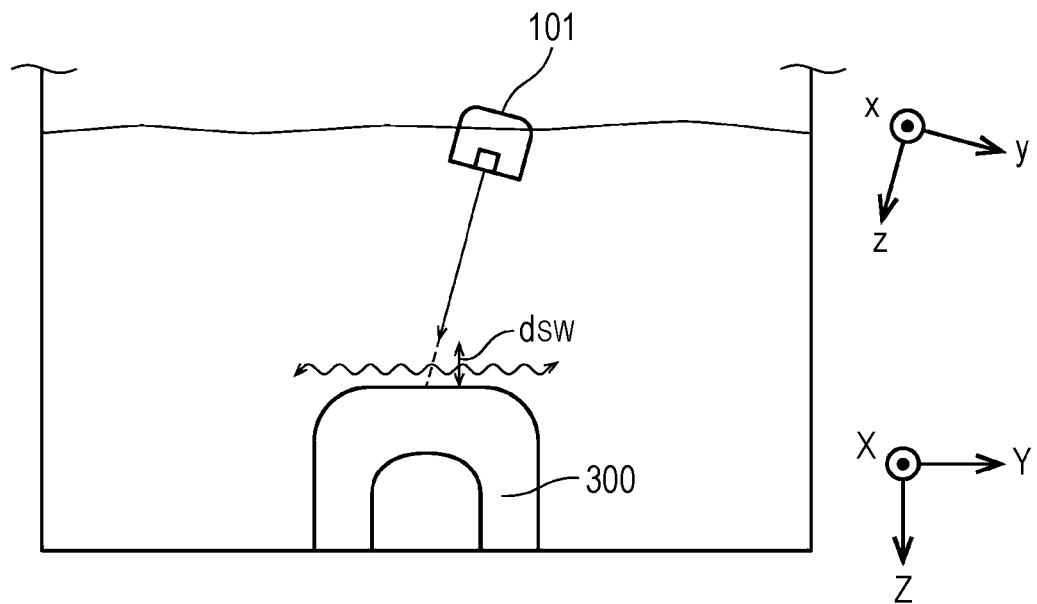
FIGS. 5A and 5B are schematic diagrams showing a relationship between a surface wave of the test object and a direction of travel of ultrasound beam according to the embodiment and the comparative example.
Figure 5B:
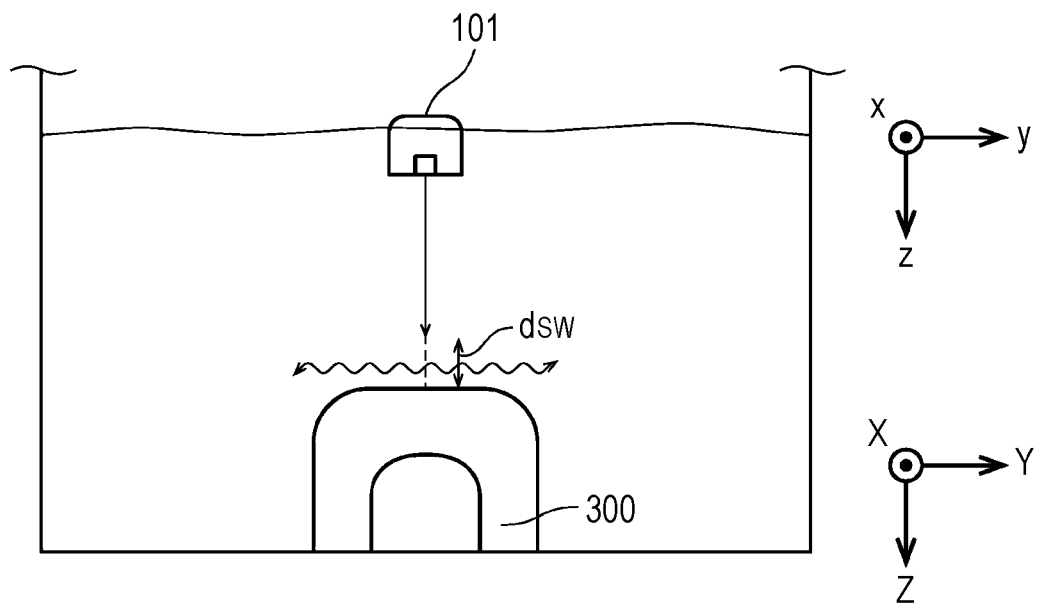

FIGS. 5A and 5B are schematic diagrams showing a relationship between the short axis of an ultrasound probe provided with transducers arrayed in one direction and the surface of a test object, and a state of surface wave on the surface of the test object. FIG. 5B shows a state in which ultrasound wave is transmitted in a direction perpendicular to the transducer surface of the ultrasound probe and the surface of the test object with the transducer surface and the surface of the test object facing each other in parallel. At the interface between the test object and the liquid, surface wave (shear wave) that vibrates in the direction perpendicular to the interface and propagates in the direction along the interface is likely to be generated. Therefore, when an ultrasound beam, which is a dense wave propagating in the direction perpendicular to the surface of the test object, is emitted, the vibration direction of the surface wave and the vibration direction of the ultrasound beam coincide with each other. Accordingly, the surface wave is likely to be excited by the ultrasound beam. Furthermore, when the ultrasound beam is emitted in the direction perpendicular to the surface of the test object, the direction of travel and vibration direction of the reflected ultrasound wave also coincides with the vibration direction of the surface wave, so that noise caused by the surface wave is likely to be included in the reflected ultrasound wave. Therefore, the noise volume increases, and the S/N ratio decreases.

In view of the above, the inventor has searched for a way to address the abovementioned problems, examined a method for improving the quality of a reception signal, and reached the mode of the present disclosure.

An ultrasound flaw detection method according to an embodiment and an ultrasound flaw detector using the same will be described below in detail with reference to the drawings.

Embodiment

Hereinafter, an ultrasound flaw detector 100 according to the embodiment will be described with reference to the drawings.

Figure 1:
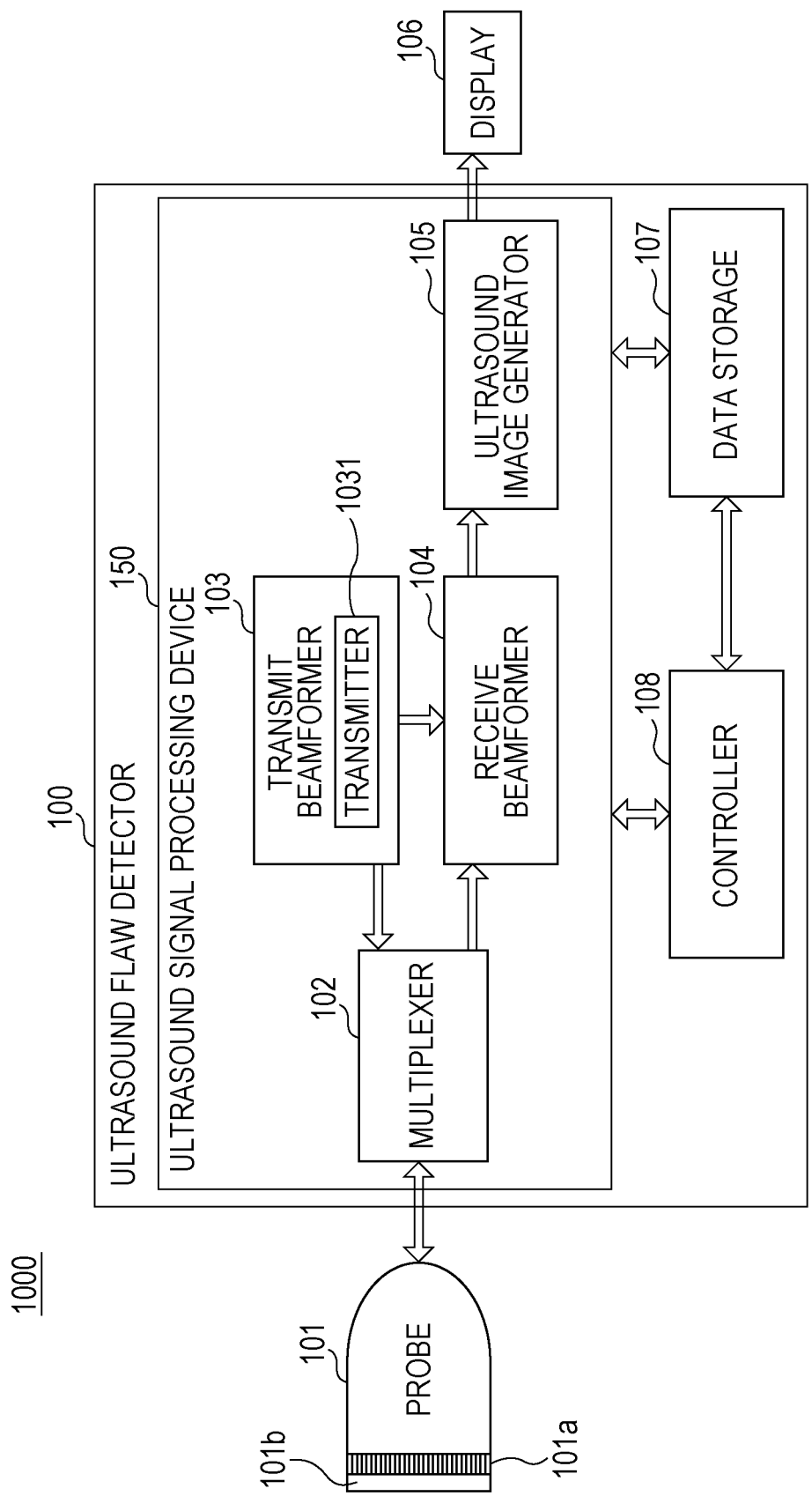
FIG. 1 is a functional block diagram showing a configuration of an ultrasound flaw detection system according to an embodiment.

FIG. 1 is a functional block diagram showing a configuration of the ultrasound flaw detection system 1000 according to the embodiment. As shown in FIG. 1, the ultrasound flaw detection system 1000 includes: a probe 101 having a plurality of transducers 101a that transmits ultrasound waves to a test object and receives reflection of the ultrasound waves; the ultrasound flaw detector 100 that causes the probe 101 to transmit and receive ultrasound waves and generates an ultrasound image on the basis of an output signal from the probe 101; and a display 106 that displays the ultrasound image on a screen. Each of the probe 101 and the display 106 is connectable to the ultrasound flaw detector 100. FIG. 1 shows a state in which the probe 101 and the display 106 are connected to the ultrasound flaw detector 100. Note that the probe 101 and the display 106 may be provided inside the ultrasound flaw detector 100.

Figure 2:
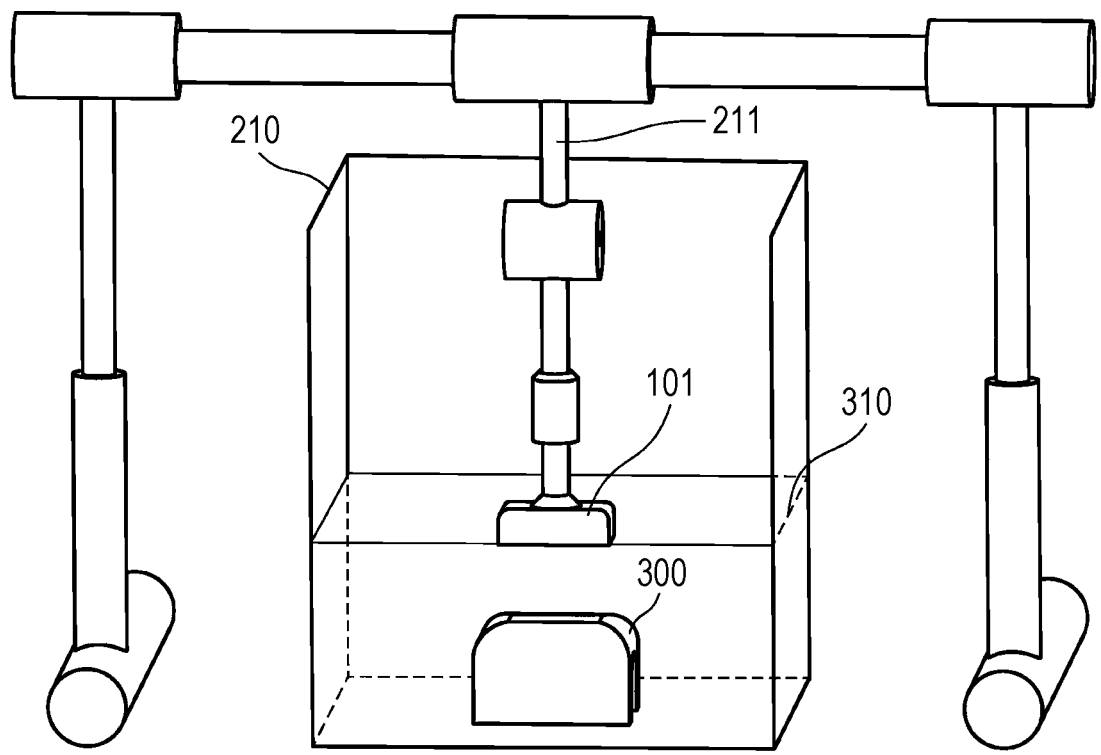
FIG. 2 is a schematic diagram showing a use state of a probe according to the embodiment.

FIG. 2 is a schematic diagram showing a relationship between the ultrasound flaw detection system 1000 and a test object 300. The test object 300 is placed in an airtight container (water tank) 210 filled with a liquid 310 such that the test object 300 is entirely immersed in the liquid 310. The test object 300 is, for example, a cast product of titanium or aluminum, a cast molded product of CFRP, and the like, but is not limited thereto. The liquid 310 is, for example, water, but is not limited thereto as long as it does not erode the test object 300 and the probe 101. The probe 101 is held by a holder 211 in a state where at least the entire transducer surface is immersed in the liquid 310. The holder 211 has at least a function of adjusting the orientation of the probe 101 in the short axis direction of the probe 101 and holding the probe 101 in a desired orientation.

Figure 3A:
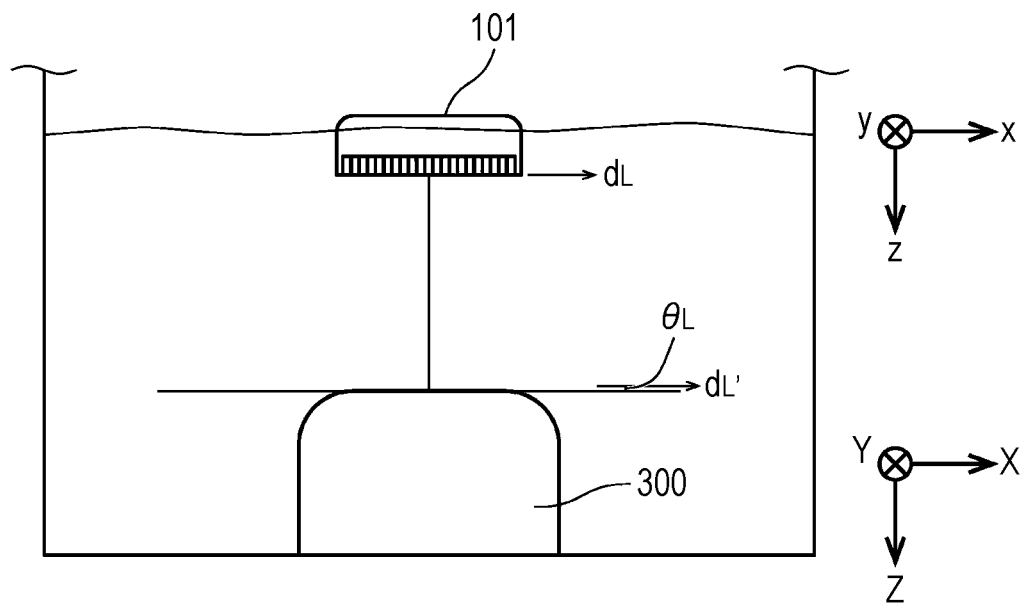
FIGS. 3A and 3B are schematic diagrams showing a relative positional relationship between the probe and a test object according to the embodiment and a comparative example.
Figure 3B:
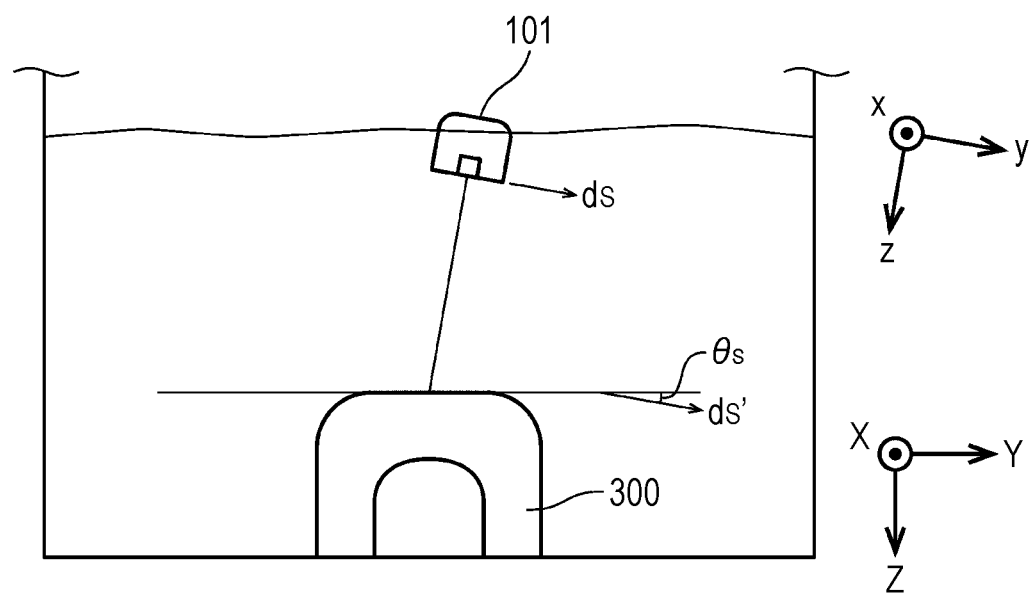

FIGS. 3A and 3B are schematic cross-sectional diagrams showing the relationship between the probe 101 and the test object 300, and as shown in FIG. 3A, the long axis direction (direction in which the transducers are arrayed) $d_L$ of the probe 101 is substantially parallel to the surface of the test object 300, and an angle $\theta_L$ between them is 0 or small enough to be regarded as 0. That is, when the long axis direction on the surface of the probe 101 is defined as an x direction, and one direction on the surface of the test object 300 is defined as an X direction, the x-axis and the X-axis are parallel. On the other hand, as shown in FIG. 3B, the short axis direction (direction perpendicular to the long axis direction on the transducer surface) ds of the probe 101 forms a predetermined angle $\theta_S$ with respect to the surface of the test object 300. That is, when the short axis direction on the surface of the probe 101 is defined as a y direction, and the direction perpendicular to the X direction on the surface of the test object 300 is defined as a Y direction, the y-axis and the Y-axis form a predetermined angle $\theta_S$. Further, when the direction perpendicular to the surface of the probe 101 is defined as a z direction, and the direction perpendicular to the surface of the test object 300 is defined as a Z direction, the z-axis and the Z-axis also form a predetermined angle $\theta_S$. With this configuration, as shown in the schematic diagram of FIG. 4A, a main component of reflected ultrasound wave reflected on the surface of the test object 300 does not directly enter the transducers 101a of the probe 101, so that multiple reflection can be suppressed. Further, as shown in the schematic diagram of FIG. 5A, the propagation direction (z direction) of an ultrasound beam and the vibration direction $d_{sw}$ (Z direction) of the surface wave are not parallel to each other, so that the excitation of the surface wave by the ultrasound beam is suppressed, and noise in the reflected ultrasound wave caused by the surface wave can be reduced. Therefore, it is preferable that the predetermined angle $\theta_S$ is at least large enough to prevent the main component of the reflected ultrasound wave reflected on the surface of the test object 300 from directly entering the transducers 101a of the probe 101. On the other hand, as the angle $\theta_S$ increases, the signal intensity of the reflected ultrasound wave on the transducers 101a decreases, and therefore, it is preferable that the angle $\theta_S$ does not increase excessively. That is, it is preferable that the angle $\theta_S$ is small enough not to reduce the signal intensity of the reflected ultrasound wave and large enough to reduce the intensity of noise caused by multiple reflection and surface wave.

<Configuration of Ultrasound Flaw Detector 100>

The ultrasound flaw detector 100 includes: a multiplexer 102 that selects a transducer to be used for transmission or reception from among the plurality of transducers 101a of the probe 101 and ensures input/output to the selected transducer; a transmit beamformer 103 that controls a timing of application of a high voltage to each of the transducers 101a of the probe 101 for transmitting ultrasound waves; and a receive beamformer 104 that amplifies electric signals obtained by the plurality of transducers 101a on the basis of the reflected waves of the ultrasound waves received by the probe 101, and performs A/D conversion and receive beamforming on the resultant signals to generate an acoustic line signal. Further, the ultrasound flaw detector 100 includes: an ultrasound image generator 105 that generates an ultrasound image (B mode tomographic image) on the basis of an output signal from the receive beamformer 104; a data storage 107 that stores an acoustic line signal generated by the receive beamformer 104 and an ultrasound image generated by the ultrasound image generator 105; and a controller 108 that controls the respective components.

Among the abovementioned components, the multiplexer 102, the transmit beamformer 103, the receive beamformer 104, and the ultrasound image generator 105 constitute an ultrasound signal processing device 150.

The components constituting the ultrasound flaw detector 100, for example, the multiplexer 102, the transmit beamformer 103, the receive beamformer 104, the ultrasound image generator 105, and the controller 108, are each implemented by a hardware circuit such as a field programmable gate array (FPGA) or application specific integrated circuit (ASIC). Alternatively, they may be each implemented by a programmable device such as a processor and software. A central processing unit (CPU) or graphics processing unit (GPU) can be used as a processor, and a configuration using a GPU is called a general-purpose computing on graphics processing unit (GPGPU). These components can each be a single circuit component or an assembly of circuit components. Further, a plurality of components can be combined into a single circuit component or can be an aggregate of a plurality of circuit components.

The data storage 107 is a computer-readable recording medium, and may be a flexible disk, hard disk, magneto-optical (MO), digital versatile disc (DVD), digital versatile disc random access memory (DVD-RAM), Blu-ray disk (BD), semiconductor memory, or the like. Further, the data storage 107 may be a storage device that is externally connectable to the ultrasound flaw detector 100.

The ultrasound flaw detector 100 according to the present embodiment is not limited to the ultrasound flaw detector having the configuration shown in FIG. 1. For example, the transmit beamformer 103 and the receive beamformer 104 may be directly connected the transducers 101a of the probe 101 without the multiplexer 102. Further, the transmit beamformer 103 and/or the receive beamformer 104, or a portion thereof may be housed in the probe 101. This is not limited to be applied to the ultrasound flaw detector 100 according to the present embodiment, and may be similarly applied to ultrasound flaw detectors according to modifications described later.

<Detailed Configuration of Ultrasound Flaw Detector 100>

Hereinafter, the transmit beamformer 103, the receive beamformer 104, and the ultrasound image generator 105, which are the main parts of the ultrasound flaw detector 100, will be described in more detail.

1. Transmit Beamformer 103

The transmit beamformer 103 is connected to the probe 101 via the multiplexer 102, and controls a timing of application of a high voltage to each of multiple transducers, constituting a transducer array included in a transmission aperture Tx, which are all or a part of the plurality of transducers 101a of the probe 101, in order to transmit ultrasound waves from the probe 101. The transmit beamformer 103 includes a transmitter 1031.

The transmitter 1031 performs a transmission process for supplying a pulsed transmission signal for causing each of the transducers included in the transmission aperture Tx from among the plurality of transducers 101a of the probe 101 to transmit an ultrasound beam on the basis of a transmission control signal from the controller 108. Specifically, the transmitter 1031 includes, for example, a clock generation circuit, a pulse generation circuit, and a delay circuit. The clock generation circuit generates a clock signal that determines a transmission timing of the ultrasound beam. The pulse generation circuit generates a pulse signal for driving each transducer. The delay circuit is for performing transmit beamforming on the ultrasound beam by setting a delay time for the transmission timing of the ultrasound beam for each transducer, and delaying the transmission of the ultrasound beam by the delay time to form a wave front of a desired shape. When the total number of transducers 101a provided in the probe 101 is 192, 20 to 100 transducers may be selected as the transducers constituting the transmission aperture Tx.

Figure 6A:
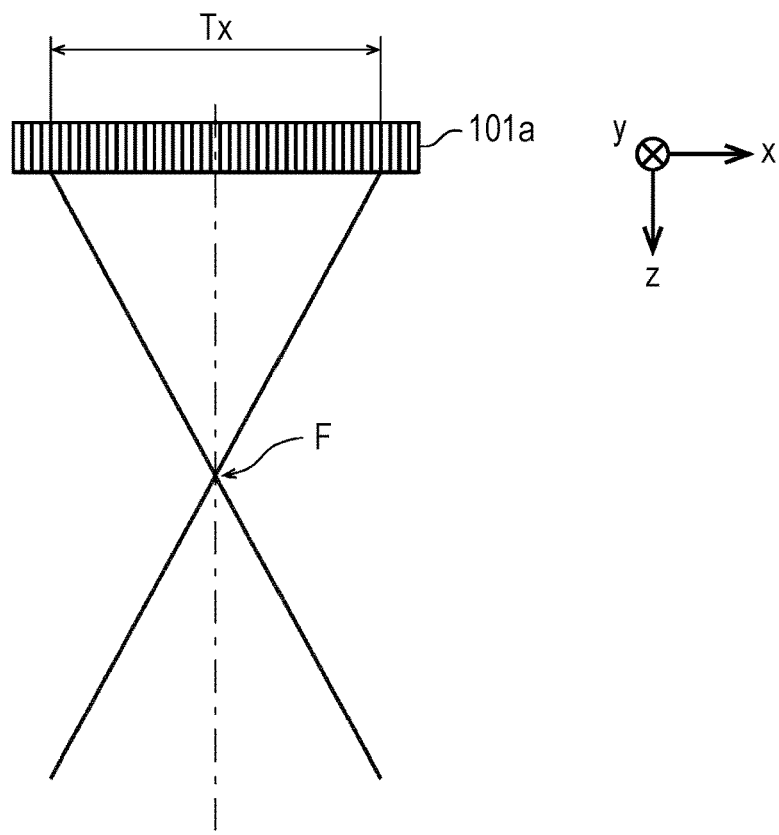
FIGS. 6A and 6B are schematic diagrams schematically showing transmit beamforming according to the embodiment.

The transmit beamformer 103 controls the transmission timing of each transducer so that the transmission timing of the transducer located at the center of the transmission aperture Tx is delayed most. As a result, as shown in the schematic diagram of FIG. 6A, for example, the wave front of the ultrasound transmission wave transmitted from the transducer array in the transmission aperture Tx is focused (condensed) at a certain point, that is, a transmission focal point F, at a certain focal depth in the liquid or the test object. The focal depth of the transmission focal point F can be freely set. The wave front focused on the transmission focal point F diffuses again, and the ultrasound transmission wave propagates in an hourglass-shaped space separated by two intersecting straight lines with the transmission aperture Tx as the base and the transmission focal point F as the node. That is, the ultrasound wave radiated at the transmission aperture Tx gradually reduces its width (x direction) in the space, minimizes its width at the transmission focal point F, and diffuses and propagates again while increasing its width as it travels to a deeper part (in the z direction) than the transmission focal point F. This hourglass-shaped region is an ultrasound main irradiation region.

Figure 6B:
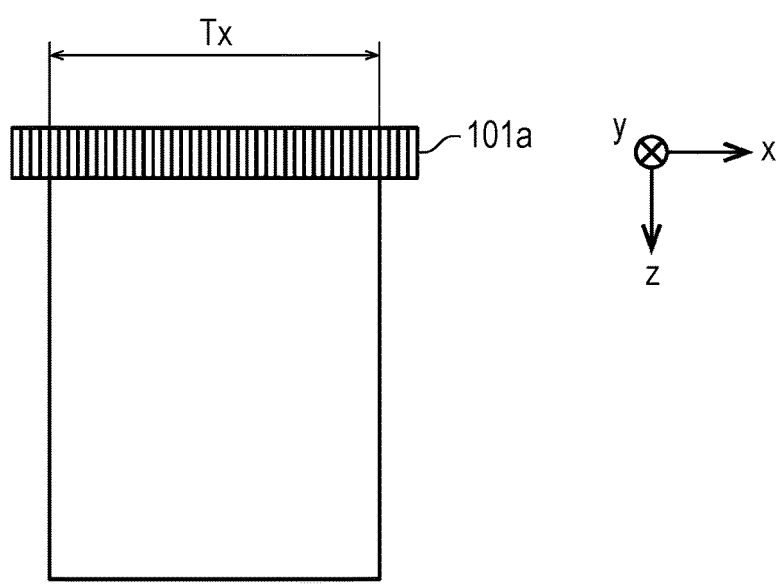

Alternatively, for example, the transmit beamformer 103 may control the transmission timing of each transducer so that the transmission timings of all transducers in the transmission aperture Tx coincide with each other. Alternatively, for example, the transmit beamformer 103 may control the transmission timing of each transducer so that a difference in transmission timing between adjacent transducers is constant. As a result, as shown in the schematic diagram of FIG. 6B, for example, the ultrasound transmission wave transmitted from the transducers in the transmission aperture Tx is a plane wave in which the wave front has a straight line with a constant inclination angle (it may be 0) with respect to the x direction. Therefore, the ultrasound main irradiation region has a rectangular shape or a shape of parallelogram having the transmission aperture Tx as one side.

2. Configuration of Receive Beamformer 104

Figure 7:
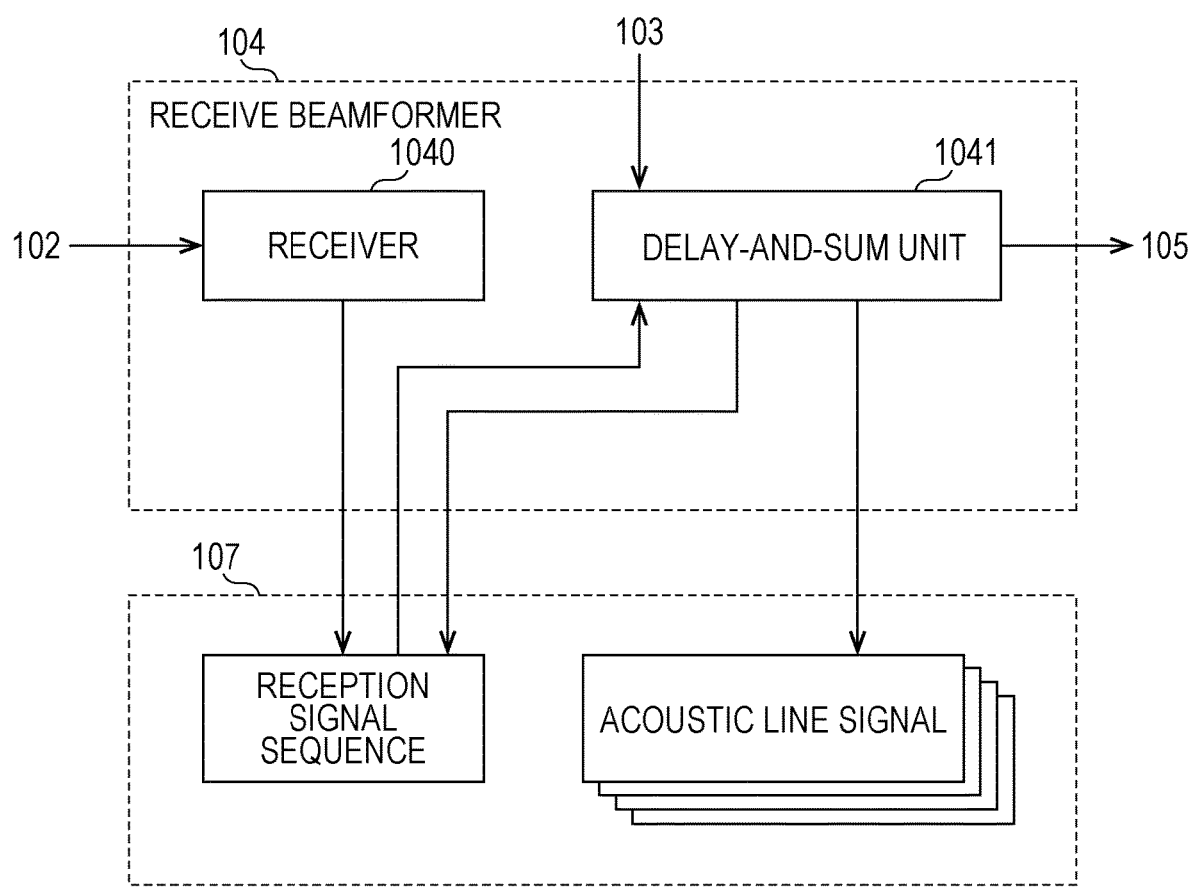
FIG. 7 is a functional block diagram showing the configuration of a receive beamformer according to the embodiment.

The receive beamformer 104 generates an acoustic line signal from the electric signals obtained by the plurality of transducers 101a on the basis of the reflected wave of the ultrasound wave received by the probe 101. Note that an "acoustic line signal" is a signal, for a certain observation point, that has been subjected to delay-and-sum processing. The delay-and-sum processing will be described later. FIG. 7 is a functional block diagram showing the configuration of the receive beamformer 104. As shown in FIG. 7, the receive beamformer 104 includes a receiver 1040 and a delay-and-sum unit 1041.

Hereinafter, the configuration of each unit constituting the receive beamformer 104 will be described.

(1) Receiver 1040

The receiver 1040 is a circuit that is connected to the probe 101 via the multiplexer 102 and that generates a reception signal (RF signal) which is obtained by amplifying an electric signal obtained from reception of ultrasound reflected wave by the probe 101 in synchronization with a transmission event, and then, performing AD conversion on the resultant signal. The receiver 1040 generates the reception signal in chronological order of the transmission events, outputs the generated reception signal to the data storage 107, and stores the same in the data storage 107.

Here, the reception signal (RF signal) is a digital signal obtained by A/D conversion of an electric signal converted from the reflected ultrasound wave received by each transducer, and is formed as a sequence of signals that are continuous in transmission direction (depth direction of the test object) of the ultrasound wave received by each transducer.

As described above, the transmitter 1031 causes each of a plurality of transducers included in the transmission aperture Tx from among the plurality of transducers 101a of the probe 101 to transmit an ultrasound beam. In contrast, the receiver 1040 generates a reception signal sequence for each of the transducers on the basis of the reflected ultrasound wave obtained by each of the transducers corresponding to some or all of the plurality of transducers 101a provided in the probe 101 in synchronization with the transmission of ultrasound beam. Here, the transducer that receives the reflected ultrasound wave is referred to as a "reception transducer". It is preferable that the number of reception transducers is larger than the number of transducers included in the transmission aperture Tx. In addition, the number of reception transducers may be equal to the total number of transducers 101a provided in the probe 101.

(2) Delay-and-Sum Unit 1041

Figure 8:
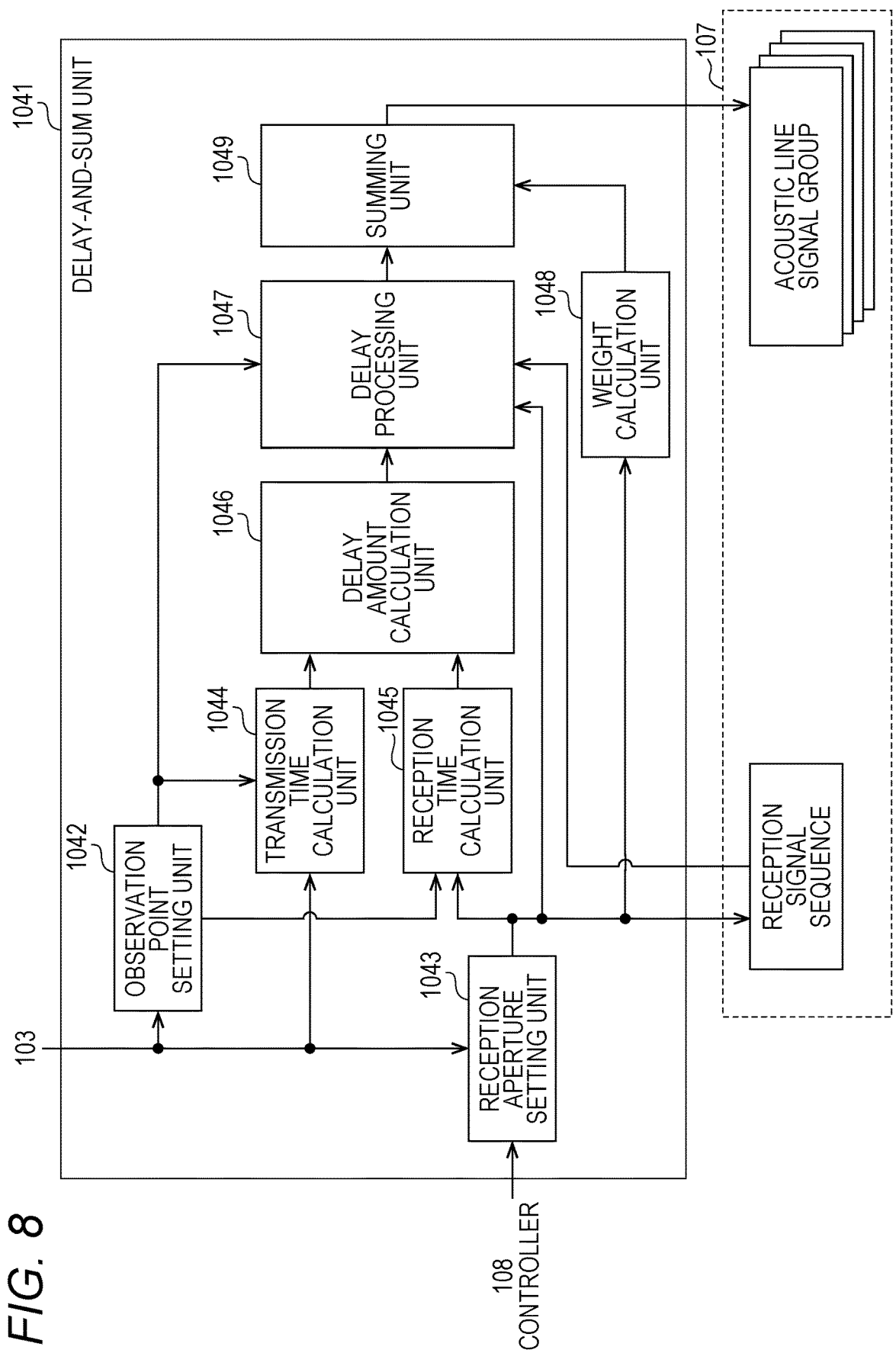
FIG. 8 is a functional block diagram showing the configuration of a delay-and-sum unit according to the embodiment.

The delay-and-sum unit 1041 is a circuit as described below. Specifically, the delay-and-sum unit 1041 sets a plurality of observation points Pij where a subframe acoustic line signal is generated in the test object in synchronization with the transmission of the ultrasound beam. Next, the delay-and-sum unit 1041 applies, for each observation point Pij, delay-and-sum processing on the reception signal sequence received by each reception transducer Rk from the observation point. Then, the delay-and-sum unit 1041 generates an acoustic line signal at each observation point. FIG. 8 is a functional block diagram showing the configuration of the delay-and-sum unit 1041. As shown in FIG. 8, the delay-and-sum unit 1041 includes an observation point setting unit 1042, a reception aperture setting unit 1043, a transmission time calculation unit 1044, a reception time calculation unit 1045, a delay amount calculation unit 1046, a delay processing unit 1047, a weight calculation unit 1048, and a summing unit 1049.

The configuration of each unit constituting the delay-and-sum unit 1041 will be described below.

i) Observation Point Setting Unit 1042

The observation point setting unit 1042 sets a plurality of observation points Pij that are targets where acoustic line signals are generated in the test object. The observation point Pij is set, for convenience of calculation, as an observation target point at which the acoustic line signal is generated in synchronization with the transmission of the ultrasound beam.

Here, the "acoustic line signal group" is a set of acoustic line signals for all the observation points Pij set in synchronization with the transmission of the ultrasound beam. That is, the acoustic line signal group refers to a unit for forming a set of signals, corresponding to the observation points Pij, which are obtained by one transmission of an ultrasound beam and the accompanying reception processing. The acoustic line signal for one frame of the ultrasound flaw detector 100 may include one acoustic line signal group or a plurality of acoustic line signal groups.

The observation point setting unit 1042 sets a plurality of observation points Pij in synchronization with the transmission of the ultrasound beam on the basis the information indicating the position of the transmission aperture Tx acquired from the transmit beamformer 103. For example, when a focused wave is transmitted as the ultrasound beam, the observation point setting unit 1042 sets the observation point Pij on or near the transmission central axis (straight line connecting the center of the transmission aperture Tx and the focal point F). More specifically, the observation point setting unit 1042 sets a plurality of observation points Pij on the central axis and/or on a straight line which is near the central axis and is parallel to the central axis. Alternatively, when, for example, a plane wave is transmitted as the ultrasound beam, the observation point setting unit 1042 sets a plurality of observation points Pij at equal intervals within the ultrasound main irradiation region so that the spatial density is constant.

The set observation points Pij are output to the transmission time calculation unit 1044, the reception time calculation unit 1045, and the delay processing unit 1047.

ii) Reception Aperture Setting Unit 1043

The reception aperture setting unit 1043 is a circuit that selects a transducer array (reception transducer array) corresponding to a part or all of the plurality of transducers provided in the probe 101 as a reception transducer to set the reception aperture Rx on the basis of a control signal from the controller 108 and information indicating the position of the transmission aperture Tx from the transmit beamformer 103.

The reception aperture Rx can be selected such that the array center matches a transducer that is spatially closest to the observation point Pij (observation point synchronous type). In this case, the reception aperture Rx is set for each observation point Pij. Alternatively, the reception aperture Rx may be set such that the array center of the reception aperture Rx matches the array center of the transmission aperture Tx (transmission aperture synchronous type), for example. In this case, the reception aperture Rx is set in synchronization with the transmission of the ultrasound beam.

In either case, in order to receive reflected waves from the entire ultrasound main irradiation region, the number of transducers included in the reception aperture Rx is preferably set to be equal to or larger than the number of transducers included in the transmission aperture Tx in the corresponding transmission event. The number of transducer arrays constituting the reception aperture Rx may be 32, 64, 96, 128, 192, or the like, for example.

Information indicating the position of the selected reception aperture Rx is output to the data storage 107 via the controller 108.

The data storage 107 outputs information indicating the position of the reception aperture Rx and the reception signal corresponding to the reception transducer to the transmission time calculation unit 1044, the reception time calculation unit 1045, the delay processing unit 1047, and the weight calculation unit 1048.

iii) Transmission Time Calculation Unit 1044

The transmission time calculation unit 1044 is a circuit that calculates a transmission time until the transmitted ultrasound wave reaches each of the observation points Pij in the test object. The transmission time calculation unit 1044 calculates, for each observation point Pij, a transmission time until the transmitted ultrasound wave reaches the observation point Pij in the test object on the basis of the information indicating the positions of the transducers included in the transmission aperture Tx acquired from the data storage 107 and the information indicating the position of the observation point Pij acquired from the observation point setting unit 1042. The transmission time calculation unit 1044 calculates the transmission time on the basis of, for example, the geometrically calculated distance between the transmission aperture Tx and the observation point Pij.

The transmission time calculation unit 1044 calculates, for all the observation points Pij, transmission times until the transmitted ultrasound wave reaches the observation points Pij in the test object in synchronization with the transmission of the ultrasound beam, and outputs the calculated transmission times to the delay amount calculation unit 1046.

iv) Reception Time Calculation Unit 1045

The reception time calculation unit 1045 is a circuit that calculates a reception time until the reflected wave from the observation point Pij reaches each of the reception transducers Rk included in the reception aperture Rx. The reception time calculation unit 1045 calculates a reception time until the transmitted ultrasound wave reflected on the observation point Pij in the test object reaches each reception transducer Rk in the reception aperture Rx in synchronization with the transmission of the ultrasound beam on the basis of the information indicating the position of the reception transducer Rk acquired from the data storage 107 and the information indicating the position of the observation point Pij acquired from the observation point setting unit 1042. The reception time calculation unit 1045 calculates the reception time on the basis of, for example, the geometrically calculated distance between the observation point Pij and the reception transducer Rk.

The reception time calculation unit 1045 calculates, for all the observation points Pij, reception times until the transmitted ultrasound waves reflected on the observation points Pij reach each reception transducer Rk in synchronization with the transmission of the ultrasound beam, and outputs the calculated reception times to the delay amount calculation unit 1046.

v) Delay Amount Calculation Unit 1046

The delay amount calculation unit 1046 is a circuit that calculates the total propagation time of the transmitted ultrasound wave to each reception transducer Rk in the reception aperture Rx from the transmission time and the reception time, and calculates a delay amount to be applied to the reception signal sequence corresponding to each reception transducer Rk on the basis of the calculated propagation time. The delay amount calculation unit 1046 acquires the transmission time until the ultrasound wave reaches the observation point Pij transmitted from the transmission time calculation unit 1044, and the reception time until the ultrasound wave reflected on the observation point Pij reaches each reception transducer Rk. Then, the delay amount calculation unit 1046 calculates the total propagation time until the transmitted ultrasound wave reaches each reception transducer Rk, and calculates a delay amount for each reception transducer Rk from the difference in total propagation time among reception transducers Rk. The delay amount calculation unit 1046 calculates, for all the observation points Pij, the delay amount to be applied to the reception signal sequence for each reception transducer Rk, and outputs the calculated delay amount to the delay processing unit 1047.

vi) Delay Processing Unit 1047

The delay processing unit 1047 is a circuit that identifies a reception signal corresponding to a delay amount for each of the reception transducers Rk from the reception signal sequence for the reception transducers Rk in the reception aperture Rx as a reception signal corresponding to each reception transducer Rk based on the reflected ultrasound wave from the observation point Pij.

In synchronization with the transmission of the ultrasound beam, the delay processing unit 1047 obtains, as inputs: information indicating the position of the reception transducer Rk from the reception aperture setting unit 1043; a reception signal corresponding to the reception transducer Rk from the data storage 107; information indicating the position of the observation point Pij obtained from the observation point setting unit 1042; and the delay amount to be applied to the reception signal sequence for each of the reception transducers Rk from the delay amount calculation unit 1046. Then, the delay processing unit 1047 identifies the reception signal corresponding to the time obtained by subtracting the delay amount for each of the reception transducers Rk from the reception signal sequence corresponding to each of the reception transducers Rk as the reception signal based on the reflected wave from the observation point Pij, and outputs the identified signal to the summing unit 1049.

vii) Weight Calculation Unit 1048

The weight calculation unit 1048 is a circuit that calculates a weighted numerical sequence (reception apodization) for each of the reception transducers Rk so as to maximize the weight for the transducer positioned at the center of the reception aperture Rx in the array direction. The weighted numerical sequence is a sequence of weighting coefficients to be applied to the reception signal corresponding to each of the transducers in the reception aperture Rx. The weighted numerical sequence has a symmetric distribution around the transmission focal point F as a center. The shape of the distribution of the weighted numerical sequence may be a hamming window, a hanning window, a rectangular window, or the like, and the shape of the distribution is not particularly limited. The weighted numerical sequence is set to maximize the weight for the transducer located at the center of the reception aperture Rx in the array direction, and the central axis of the weight distribution matches a central axis Rxo of the reception aperture. The weight calculation unit 1048 calculates a weighted numerical sequence for each of the reception transducers Rk using information indicating the position of the reception transducer Rk output from the reception aperture setting unit 1043 as an input, and outputs the result to the summing unit 1049.

viii) Summing Unit 1049

The summing unit 1049 is a circuit that receives and sums the reception signals identified corresponding to each of the reception transducers Rk output from the delay processing unit 1047 to generate a delay-and-summed acoustic line signal for the observation point Pij. Alternatively, the summing unit 1049 may be formed to receive the weighted numerical sequence for each of the reception transducers Rk output from the weight calculation unit 1048, and sums the reception signals identified corresponding to each of the reception transducers Rk after multiplying the weights for the respective reception transducers Rk to the reception signals, thereby generating an acoustic line signal for the observation point Pij. Due to the configuration in which the delay processing unit 1047 phases the reception signals detected by the reception transducers Rk in the reception aperture Rx, and the summing unit 1049 performs summing processing, it is possible to superimpose the reception signals received by the reception transducers Rk with each other to increase the signal S/N ratio on the basis of the reflected wave from the observation point Pij, and to extract the reception signal from the observation point Pij.

It is possible to generate the acoustic line signal for all the observation points Pij with one ultrasound-beam transmission and the associated processing.

3. Configuration of Ultrasound Image Generator 105

The ultrasound image generator 105 acquires an acoustic line signal for one frame, and performs coordinate transformation to a Cartesian coordinate system and conversion to a luminance value to convert the acoustic line signal into an ultrasound image (B-mode tomographic image) Coordinate transformation to a Cartesian coordinate system is performed, for example, by converting information indicating the position of the observation point Pij into xz coordinates or XZ coordinates. Further, the conversion to the luminance value is performed in such a way that envelope detection is performed on the acoustic line signal to remove the frequency component of the transmitted ultrasound wave, and logarithmic compression is performed to improve the contrast of the ultrasound image. By the above processing, an ultrasound image of one frame is generated on the basis of the acoustic line signal of one frame.

<Operation>

The operation of the ultrasound flaw detector 100 having the above configuration will be described.

Figure 9:
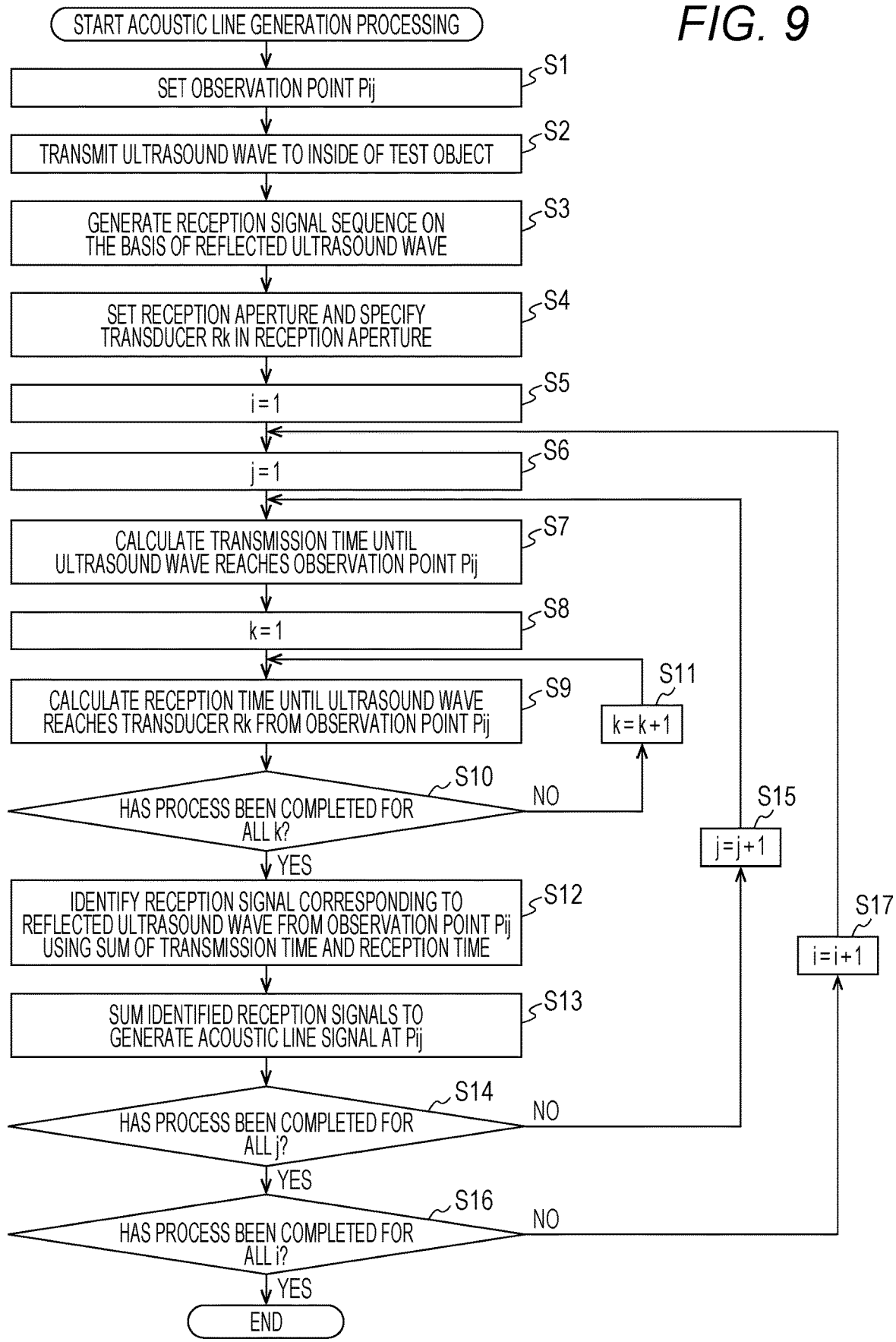
FIG. 9 is a flowchart showing an acoustic line signal generation operation of the receive beamformer according to the embodiment.

FIG. 9 is a flowchart showing a beamforming processing operation of the receive beamformer 104.

First, in step S1, the observation point setting unit 1042 acquires information indicating the position of the transmission aperture Tx from the transmitter 1031 and sets a plurality of observation points Pij.

Next, in step S2, the transmitter 1031 supplies a transmission signal for causing the transducers included in the transmission aperture Tx from among the plurality of transducers 101a provided in the probe 101 to transmit ultrasound beams, thereby transmitting ultrasound beams to the inside of the test object.

Next, in step S3, the receiver 1040 generates a reception signal on the basis of an electric signal obtained by receiving reflected wave of ultrasound wave by the probe 101, outputs the generated reception signal to the data storage 107, and stores the same in the data storage 107.

Next, in step S4, the reception aperture setting unit 1043 sets the reception aperture Rx. Here, the reception aperture Rx is selected so that the array center of the transmission aperture Tx and the array center of the reception aperture Rx coincide with each other.

Next, an acoustic line signal is generated for the observation point Pij. First, variables i and j are initialized in steps S5 and S6.

Next, in step S7, the transmission time calculation unit 1044 calculates, for the observation point Pij, the time until the transmitted ultrasound wave reaches the observation point Pij in the test object. The transmission time is calculated by dividing a length of a path from the transmission aperture Tx to the observation point Pij by the sound speed of the ultrasound wave. Here, the length of the path is assumed to be defined as a linear distance from the transmission aperture Tx to the observation point Pij. Note that the linear distance from the transmission aperture Tx to the observation point Pij is one example of the length of the path, and the length of the path is not limited thereto. Any path suitable for the transmit beamforming method and the receive beamforming method may be selected.

Next, in step S8, a coordinate k indicating the position of the reception transducer Rk in the reception aperture Rx is initialized to a minimum value in the reception aperture Rx, and in step S9, a reception time until the ultrasound wave reflected on the observation point Pij reaches the reception transducer Rk in the reception aperture Rx is calculated. Here, the length of the path is assumed to be defined as a linear distance from the observation point Pij to the reception transducer Rk. Note that the linear distance from the observation point Pij to the reception transducer Rk is one example of the length of the path, and the length of the path is not limited thereto. Any path suitable for the transmit beamforming method and the receive beamforming method may be selected.

Next, in step S10, it is determined whether the reception-time calculation has been completed for all the reception transducers Rk included in the reception aperture Rx. If it is not completed, the coordinate k is incremented in step S11, and the process of step S9 is again performed. If it is completed, the processing proceeds to step S12. Thus, the reception times for all reception transducers Rk in the reception aperture Rx have been calculated.

Next, in step S12, a reception signal based on the reflected ultrasound wave from the observation point Pij is identified using the sum of the transmission time and the reception time. First, the delay amount calculation unit 1046 calculates the total propagation time for each reception transducer Rk from the sum of the transmission time calculated in step S7 and the reception time for each reception transducer Rk calculated in steps S8 to S11, and calculates the delay amount for each of the reception transducers Rk by the difference in the total propagation time for each of the reception transducers Rk within the reception aperture Rx. Next, the delay processing unit 1047 identifies the reception signal corresponding to the time obtained by subtracting the delay amount for each of the reception transducers Rk from the reception signal sequence corresponding to each of the reception transducers Rk within the reception aperture Rx as the reception signal based on the reflected wave from the observation point Pij.

Next, in step S13, the identified reception signals are summed to generate an acoustic line signal at Pij. First, the weight calculation unit 1048 calculates a weighted numerical sequence for each of the reception transducers Rk so as to maximize the weight for the transducer positioned at the center of the reception aperture Rx in the array direction. The summing unit 1049 multiplies the reception signal identified corresponding to each of the reception transducers Rk by the weight for each of the reception transducers Rk, and sums the results to generate an acoustic line signal for the observation point Pij. The acoustic line signal generated for the observation point Pij is output to and stored in the data storage 107.

Next, the coordinates ij are incremented, and the processes of steps S7 to S13 are repeated, whereby acoustic line signals are generated for all the observation points Pij. It is determined whether generation of acoustic line signals has been completed for all the observation points Pij (steps S14 and S16). If it is not completed, the coordinates ij are incremented (step S15 and S17) to generate an acoustic line signal for the observation point Pij. When acoustic line signals are generated for all the observation points Pij, the generation of acoustic line signal group corresponding to the transmission of ultrasound beam in step S2 is completed.

<Effect>

The effect of the present embodiment will be described below in more detail.

Figure 10:
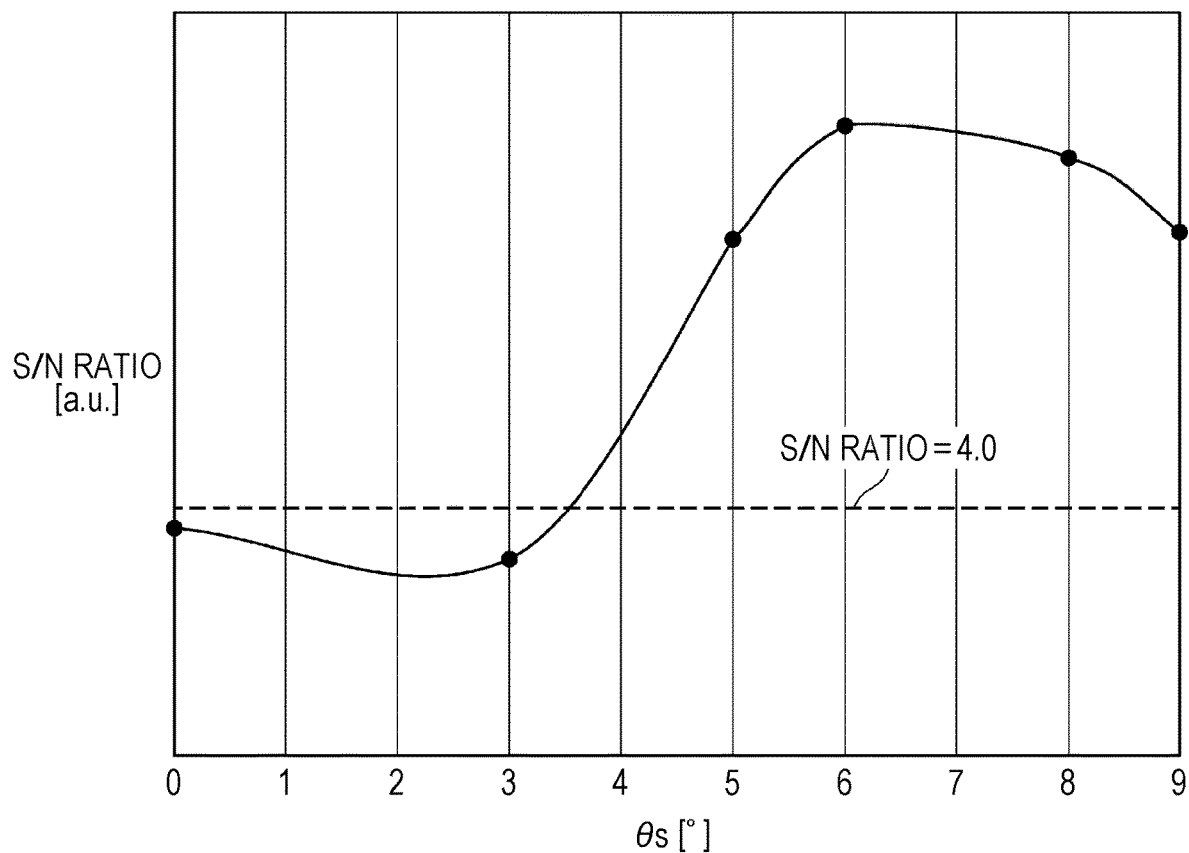
FIG. 10 is a graph showing a relationship between an inclination of the probe in a short axis direction with respect to a normal of a surface of the test object and an S/N ratio of a reception signal.
Figure 11A:
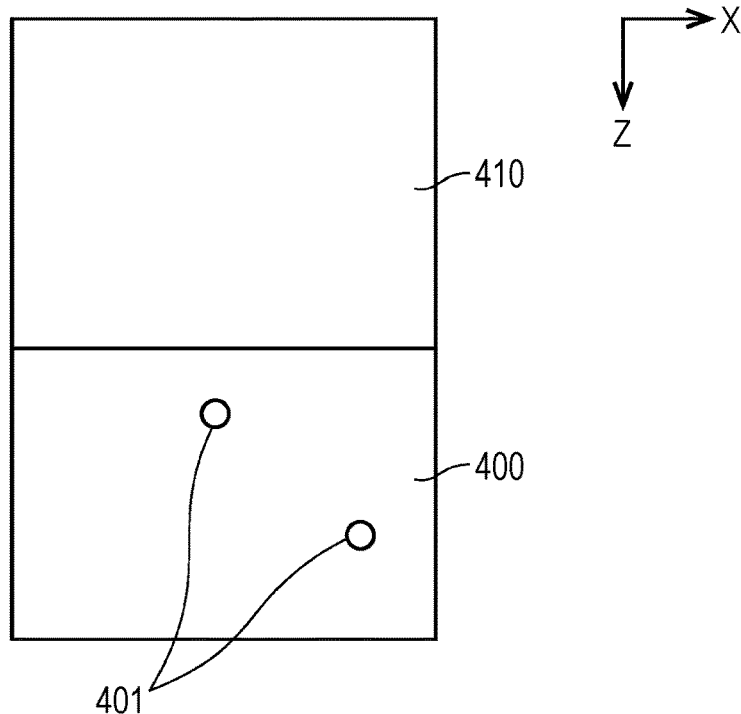
FIGS. 11A and 11B are examples of ultrasound images according to the embodiment and the comparative example.
Figure 11B:
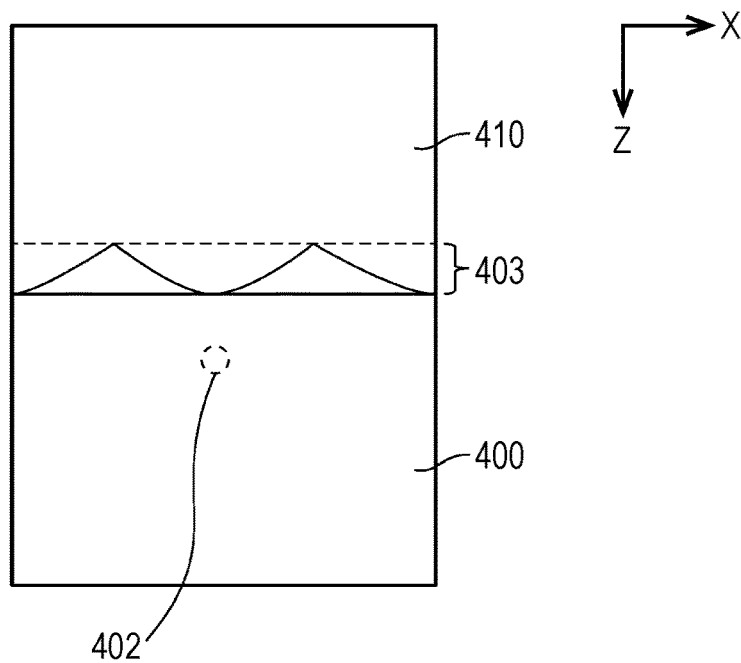

FIG. 10 is a graph showing a relation between an angle $\theta_S$ between the short axis direction ds of the probe 101 and the surface of the test object 300 and an average value of S/N ratios of acoustic line signals for observation points Pij provided on the surface or inside of the test object 300. As described above, when the angle $\theta_S$ is small enough to allow the main component of the reflected ultrasound wave to directly enter the transducers 101a, the noise intensity is increased due to multiple reflection. Further, the smaller the angle $\theta_S$, the stronger the surface wave, so that noise contained in the reflected ultrasound wave increases. Therefore, the smaller the angle $\theta_S$, the larger the noise, and the larger the angle $\theta_S$, the smaller the noise. On the other hand, the larger the angle $\theta_S$, the smaller the reception intensity of the reflected ultrasound waves. Therefore, the smaller the angle $\theta_S$, the larger the signal intensity, and the larger the angle $\theta_S$, the smaller the signal intensity. Therefore, it is at least preferable that the angle $\theta_S$ is large enough to suppress multiple reflection and small enough to prevent excessive decrease in signal intensity. More specifically, if the S/N ratio is 4 or more, an ultrasound image can be obtained which enables visual recognition of defects or the like and which prevents false recognition of noise as defects or the like. In order to obtain such ultrasound image, it is preferable to set the angle $\theta_S$ to be 5 degrees or more and 10 degrees or less. For example, when the angle $\theta_S$ is about 0 degrees, an artifact 403 due to a surface wave appears at the boundary between an image 400 of the test object 300 and an image 410 of the liquid 310, and an S/N ratio is small, and therefore, the image of void 402 is not clear as indicated in the example of an ultrasound image in FIG. 11B. In contrast, if the angle $\theta_S$ is appropriate, an ultrasound image can be obtained in which the image 401 of void is clear because of no artifact due to surface wave at the boundary between the image 400 of the test object 300 and the image 410 of the liquid 310, and large S/N ratio, as indicated in the example of an ultrasound image in FIG. 11A. Therefore, according to the ultrasound flaw detection system 1000 according to the present embodiment, it is possible to obtain a high-quality ultrasound image in which an image of a defect or the like is clear and which has less artifacts that may lead to false detection.

<Summary>

As described above, according to the ultrasound flaw detection system 1000 according to the present embodiment, an ultrasound image can be obtained which has less influence of noise caused by multiple reflection of ultrasound wave or surface wave and which has improved spatial resolution and S/N ratio. Therefore, defects such as cracks and voids in the test object can be found with high accuracy. In particular, due to suppression of noise caused by surface wave, it is also possible to assess the roughness of the surface and the presence or absence of depressions, and it is possible to test the entire test object regardless of the shape of the test object.

Further, in the ultrasound flaw detection system 1000, the short axis direction of the probe 101 is tilted with respect to the test object 300. With this configuration, the influence of noise caused by multiple reflection of ultrasound wave or surface wave is suppressed, while there is no variation in distance between the transducers and the surface of the test object 300. Therefore, unlike the case where the long axis direction of the probe 101 is tilted with respect to the test object 300, even if there is a great difference in refractive index between the test object and the liquid, the transmission time and the reception time with respect to the interface between the test object and the liquid can be corrected without depending on the position of the reception aperture, whereby an amount of calculation can be reduced.

<<First Modification>>

In the embodiment, control for transmit beamforming and receive beamforming is not particularly changed between the inside of the test object and the inside of the liquid. However, when the test object and the liquid differ in refractive index, the ultrasound propagation path bends in the y and Y directions at the interface between the test object and the liquid according to Snell's law. Therefore, there may be displacement between the calculated position of the observation point in the test object and the position corresponding to the observation point in the test object.

In view of this, in the first modification, the propagation direction (Z direction) of ultrasound wave is corrected when coordinate transformation is performed.

Figure 12A:
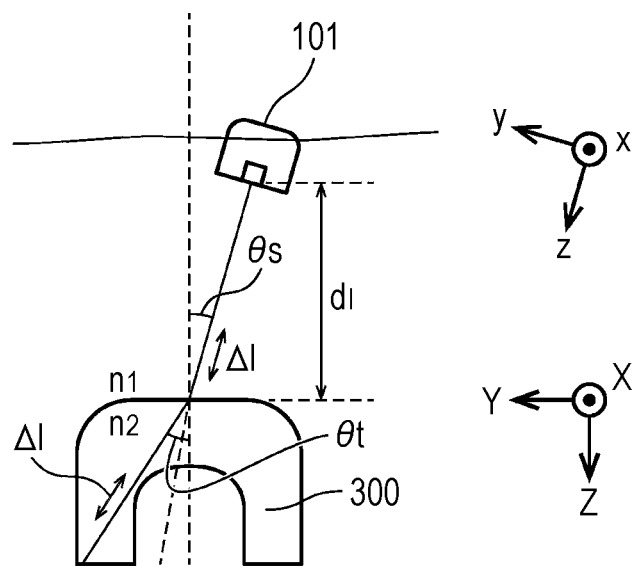
FIGS. 12A and 12B are each a schematic diagram showing a propagation path of ultrasound beam and an example of an ultrasound image according to a first modification.

FIG. 12A is a schematic diagram for describing the correction in the Z direction. As shown in FIG. 12A, the probe 101 transmits an ultrasound beam in the z direction perpendicular to the transducer surface of the probe 101. At this time, the Z direction and the z direction perpendicular to the surface of the test object 300 form an angle $\theta_S$. Therefore, the range of a width $\Delta l$ along the z direction corresponds to the range of a width $\Delta d$ that satisfies the following equation in the Z direction.

$$\Delta d = \Delta l \times \cos \theta_S \quad \text{Equation (A)}$$

On the other hand, the ultrasound beam changes its propagation direction on the surface of the test object 300. When the refractive index of the liquid with respect to ultrasound wave is $n_1$ and the refractive index of the test object 300 is $n_2$, the ultrasound beam propagates in the test object 300 in a direction with an angle $\theta_t$ described below with respect to the surface of the test object 300.

$$n_1/n_2 = \sin \theta_S / \sin \theta_t$$

Therefore, the range of the width $\Delta l$ along the propagation direction of the ultrasound wave corresponds to the range of the width $\Delta d$ satisfying the following equation in the Z direction.

$$\Delta d = \Delta l \times \cos \theta_t \quad \text{Equation (B)}$$

Figure 12B:
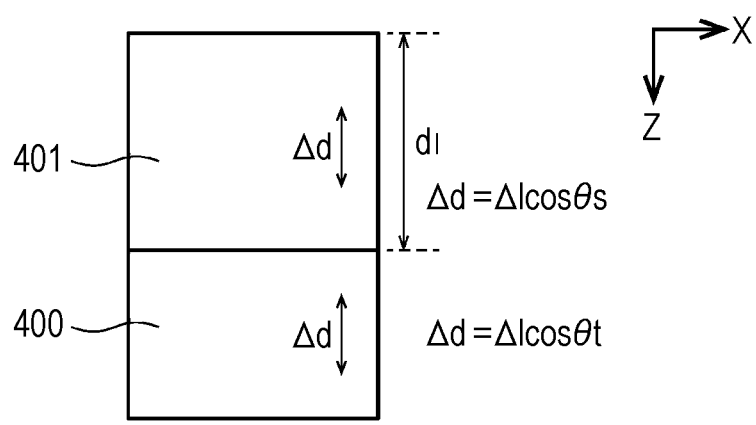

In the first modification, in the transformation to the Cartesian coordinate system upon generating an ultrasound image, the scale in the Z direction is changed between the inside of the liquid and the inside of the test object as described above. That is, in an ultrasound image shown in FIG. 12B, the image 401 of the liquid 310 is subjected to the coordinate transformation according to Equation (A), and the image 400 of the test object 300 is subjected to the coordinate transformation according to Equation (B). As a result, in the ultrasound image, the range having a certain width in the Z direction corresponds to the range having the same width in the Z direction, regardless of whether the corresponding region is in the liquid, in the test object, or extends across the liquid and the test object. Therefore, the scale in the Z direction is constant in the ultrasound image, despite the difference in refractive index between the test object and the liquid. Accordingly, defects or the like in the test object can be correctly recognized without falsely recognizing the distance between the defects or the like of the test object and the surface of the test object.

<<Second Modification>>

The embodiment and the first modification have described the case where the position of the probe 101 is fixed to make the angle of incidence of ultrasound beam with respect to the surface of the test object 300 constant. Meanwhile, the influence caused by an ultrasound beam emitted in a direction perpendicular to the surface of the test object 300 mainly appears in the vicinity of the surface of the test object 300, and does not necessarily appear over the entire area of the test object 300. On the other hand, if the angle $\theta_S$ between the short axis direction ds of the probe 101 and the surface of the test object 300 is large in a case where the ultrasound wave is greatly attenuated in the test object 300, the reflected ultrasound wave from the deep part of the test object 300 may not have sufficient signal intensity.

Figure 13A:
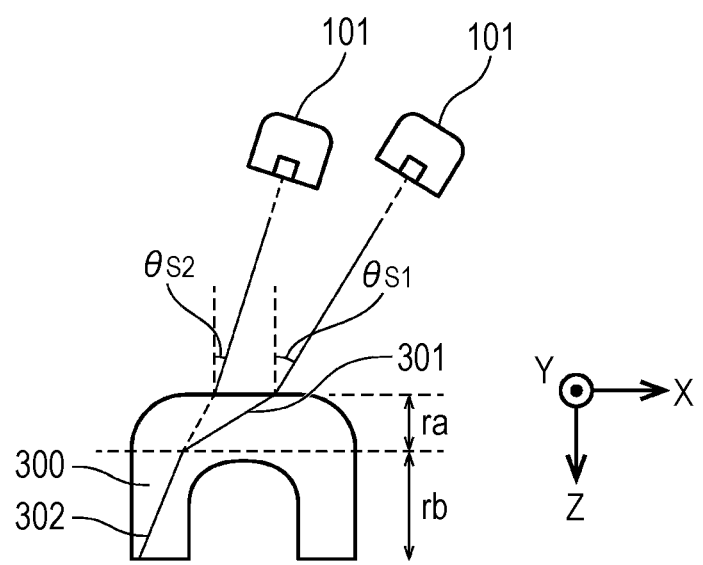
FIGS. 13A and 13B are each a schematic diagram showing a propagation path of ultrasound beam and an example of an ultrasound image according to a second modification.
Figure 13B:
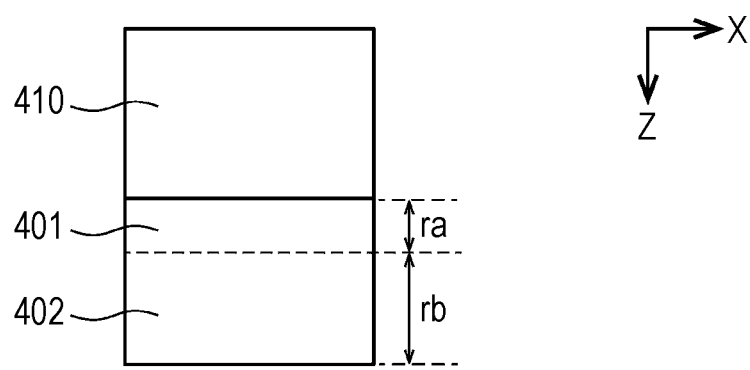

In view of this, in the second modification, the angle $\theta_S$ between the direction perpendicular to the surface of the test object 300 and the irradiation direction of ultrasound wave from the probe 101 is changed depending on the distance from the surface of the test object 300 to the observation point in the test object 300. More specifically, as shown in the schematic diagram of FIG. 13A, an angle $\theta_{S1}$ between the direction perpendicular to the surface of the test object 300 and the irradiation direction of the ultrasound wave from the probe 101 is set larger for a range $r_a$ within a predetermined distance from the surface of the test object 300, while an angle $\theta_{S2}$ between the direction perpendicular to the surface of the test object 300 and the irradiation direction of the ultrasound wave from the probe 101 is set smaller than the angle $\theta_{S1}$ for a range $r_b$ which is farther from the surface of the test object 300 than the range $r_a$. When an ultrasound image is generated, an image 401 is generated along an ultrasound wave propagation path 301 during transmission of ultrasound beam with the angle $\theta_{S1}$ for the range $r_a$ of the image of the test object 300, and an image 402 is generated along an ultrasound wave propagation path 302 during transmission of ultrasound beam with the angle $\theta_{S2}$ for the range $r_b$ of the image of the test object 300, as indicated by an ultrasound image in FIG. 13B. According to this configuration, regarding the range $r_a$, both the excitation of the surface wave and the influence of the surface wave on the reflected ultrasound wave can be suppressed, and the decrease in the S/N ratio can be suppressed. On the other hand, regarding the range $r_b$, the probe 101 is brought closer to the main propagation path of the reflected ultrasound wave to improve the signal intensity of the reflected ultrasound wave and suppress the decrease in the S/N ratio. Therefore, regarding the observation point in the test object 300, the S/N ratio of the reception signal can be improved despite the distance from the surface of the test object 300 to the observation point.

<<Other Modifications of Embodiment>>

(1) In the embodiment and each modification, the case where the probe 101 is held in a predetermined direction by the holder 211 has been described. However, the holder 211 may be formed to be able to rotate the probe 101 in the short axis direction of the probe 101, for example. With this configuration, the orientation of the probe 101 can be adjusted depending on the size and shape of the test object 300. Further, the holder 211 may have a mechanism capable of adjusting the orientation and position of the probe 101 in the short axis direction of the probe 101, and may be controllable from the ultrasound flaw detector 100, for example.

Further, the probe 101 may be a matrix type probe having transducers in a two-dimensional manner. In this case, control similar to the control in a case where the probe 101 is rotated in the short axis direction can be achieved by performing, for the short axis side of the transducer array, steering control for varying the transmission timing between the transducers to change the irradiation direction of the ultrasound beam.

(2) The embodiment and each modification do not consider the difference in refractive index between the test object and the liquid in the transmit beamforming and the receive beamforming, but the correction in the long axis direction of the probe 101 may be performed as in the correction in the short axis direction of the probe 101 in the first modification. In a case where the long axis direction of the transducer surface of the probe 101 is parallel to the surface of the test object, a correction value of the transmission time depends only on the relative positional relation between the position of the transducer and the center of the transmission aperture. Therefore, if the relative positional relation between the position of the transducer and the center of the transmission aperture is the same even when the position of the transmission aperture changes, the same correction value can be used. Similarly, a correction value of the reception time depends only on the relative positional relation between the position of the transducer and the position of the observation point Pij, and thus, if the relative positional relation between the position of the transducer and the position of the observation point Pij is the same even when the position of the observation point Pij changes, the same correction value can be used.

(3) In the embodiment and each modification, the receive beamforming process is performed in synchronization with the transmission of ultrasound waves, but the present invention is not limited thereto. For example, the mode of the present disclosure may be applied to a synthetic aperture method, and delay-and-sum processing may be performed after several transmissions and receptions of ultrasound wave for one frame are completed. Further, each operation other than the calculation of the reception time is not limited to that described above, and any control may be applied.

(4) One aspect of the present disclosure has been described based on the embodiments above, but one aspect of the present disclosure is not limited to the above embodiment, and the following configurations are also included in one aspect of the present disclosure.

For example, one aspect of the present disclosure may be a computer system including a microprocessor and a memory, in which the memory stores a computer program, and the microprocessor operates in accordance with the computer program. For example, one aspect of the present invention may be a computer system which has a computer program of an ultrasound signal processing method according to the present invention, and which is formed to operate in accordance with the program (or to issue operation instruction to connected parts).

Moreover, cases where the whole or a part of the ultrasound flaw detector, or the whole or a part of the ultrasound signal processing device is implemented by a computer system including a microprocessor, a recording medium such as a ROM or a RAM, a hard disk unit, and the like are also included in the present invention. The RAM or the hard disk unit stores a computer program capable of achieving operation similar to the operation of each of the above-described device. When the microprocessor operates according to the computer program, functions of the devices are implemented.

In addition, a portion or all of the constituents of each of the above devices may be constituted by one system large scale integration (LSI). The system LSI is a super multifunctional LSI manufactured by integrating a plurality of constituent parts on one chip, specifically, it is a computer system including a microprocessor, a ROM, a RAM, and the like. Each of the constituent parts may be formed individually on one chip, or a portion or all of the constituent parts may be formed on one chip. Note that the LSI may be referred to as an IC, a system LSI, a super LSI, or an ultra LSI depending on the degree of integration. The RAM stores a computer program capable of achieving operation similar to the operation of each of the above-described devices. When the microprocessor operates according to the computer program, functions of the system LSI are implemented. For example, the present invention includes a case where the beamforming method of the present invention is stored as a program of the LSI, and this LSI is inserted in the computer to execute the predetermined program (beamforming method).

Note that the method of circuit integration is not limited to LSI, and circuit integration may be implemented by a dedicated circuit or a general-purpose processor. It is allowable to employ a field programmable gate array (FPGA) that can be programmed after LSI fabrication, and a reconfigurable processor capable of reconfiguring connection and setting of circuit cells inside the LSI.

Further, if a new integrated circuit implementation technology comes out to replace LSI as a result of the development of semiconductor technology or another derivative technology, the functional blocks may be naturally integrated using that technology.

In addition, a part or all of the functions of the ultrasound flaw detector according to the embodiment may be implemented by execution of a program by a processor such as a CPU. The present invention may be a non-transitory computer readable recording medium storing a program for implementing the flaw detection method or the beamforming method of the abovementioned ultrasound flaw detector. Programs and signals may be recorded on a recording medium and transported to allow the program to be executed by another independent computer system, and the program may of course be distributed via a transmission medium such as the Internet.

The ultrasound flaw detector according to the above embodiment includes the data storage serving as a storage device. However, the storage device is not limited thereto, and a semiconductor memory, a hard disk drive, an optical disk drive, a magnetic storage device, etc. may be externally connected to the ultrasound flaw detector.

The division of functional blocks in the block diagram is merely illustrative. For example, a plurality of functional blocks may be implemented as one functional block, one functional block may be divided into a plurality of functional blocks, or a part of the functions may be transferred to another functional block. Further, functions of a plurality of functional blocks having similar functions may be processed in parallel or in a time-sharing manner by single piece of hardware or software.

Further, the execution order of the steps is merely an example for specifically describing the present invention. The steps may be executed in order different from the orders described above. In addition, a portion of the abovementioned steps may be executed simultaneously (in parallel) with other steps.

Further, although the probe and the display are externally connected to the ultrasound flaw detector, they may be integrally provided in the ultrasound flaw detector.

Further, in the above embodiment, the probe has a configuration in which a plurality of piezoelectric elements is arrayed in a one-dimensional direction. However, the configuration of the probe is not limited thereto. For example, a two-dimensional transducer array in which piezoelectric elements are arrayed in a two-dimensional direction or a dynamic probe in which transducers arrayed in a one-dimensional direction are mechanically swung to acquire a three-dimensional tomographic image may be used, and such probes may be used situationally depending on measurement. For example, when a two-dimensionally arrayed probe is used, it is possible to control irradiation position and direction of an ultrasound beam to be transmitted by changing a timing of application of a voltage to individual piezoelectric elements and a voltage value.

Further, a portion of functions of the transmitter/receiver may be included in the probe. For example, on the basis of a control signal outputted from the transmitter/receiver for generating a transmission electric signal, the transmission electric signal may be generated and converted to ultrasound wave in the probe. In addition, it is possible to use a configuration in which received reflected ultrasound wave is converted into a reception electric signal, and a reception signal is generated in the probe on the basis of the reception electric signal.

Further, at least a part of the functions of the ultrasound flaw detector according to the embodiment and the modifications thereof may be combined. Further, the numbers used above are all illustrative for the purpose of describing the present invention in detail, and the present invention is not limited to the numbers used above.

Further, the present invention also includes various modifications obtained by applying changes conceivable by a person skilled in the art to the present embodiment.

<<Summary>>

(1) One aspect of the present disclosure provides an ultrasound flaw detector that determines a flaw in a test object in a liquid using an ultrasound probe, the ultrasound flaw detector including: an ultrasound probe that is provided with a plurality of transducers and that is held so that a direction in which the transducers are arrayed is parallel to a surface of the test object in a state where the plurality of transducers is located in the liquid; a transmitter/receiver that, using the plurality of transducers, transmits an ultrasound beam in a first direction with a predetermined angle with respect to a normal direction of the surface of the test object and receives a reflected ultrasound wave reflected by the test object; and an ultrasound signal processor that specifies a flaw of the test object on the basis of a reception signal that has been generated by the transmitter/receiver on the basis of the reflected ultrasound wave.

In addition, one aspect of the present disclosure provides an ultrasound flaw detection method for determining a flaw in a test object in a liquid using an ultrasound probe, the method including: holding the ultrasound probe provided with a plurality of transducers so that a direction in which the transducers are arrayed is parallel to a surface of the test object in a state where the plurality of transducers is located in the liquid; transmitting an ultrasound beam in a first direction with a predetermined angle with respect to a normal direction of the surface of the test object and receiving a reflected ultrasound wave reflected by the test object, using the plurality of transducers; generating a reception signal on the basis of the reflected ultrasound wave; and specifying a flaw of the test object on the basis of the reception signal.

In addition, one aspect of the present disclosure provides a program causing a computer to perform an ultrasound flaw detection processing for determining a flaw in a test object in a liquid using an ultrasound probe, the ultrasound probe being provided with a plurality of transducers and held so that a direction in which the transducers are arrayed is parallel to a surface of the test object in a state where the plurality of transducers is located in the liquid, the ultrasound flaw detection processing including: transmitting an ultrasound beam in a first direction with a predetermined angle with respect to a normal direction of the surface of the test object and receiving a reflected ultrasound wave reflected by the test object, using the plurality of transducers; generating a reception signal on the basis of the reflected ultrasound wave; and specifying a flaw of the test object on the basis of the reception signal.

According to the ultrasound flaw detector, the ultrasound flaw detection method, and the program according to one aspect of the present disclosure, ultrasound waves are transmitted and received using the ultrasound probe so that the ultrasound beam is not perpendicular to the surface of the subject, the ultrasound probe being held so that the direction in which the transducers are arrayed is parallel to the surface of the test object. Therefore, it is possible to prevent deterioration in the quality of reception signal due to multiple reflection of ultrasound waves and surface waves of the test object, whereby the quality of the reception signal can be enhanced.

(2) Further, in the ultrasound flaw detector according to one aspect of the present disclosure, the first direction may be set so that an S/N ratio of the reception signal is 4 or more.

With the above configuration, it is possible to obtain an ultrasound image of sufficient quality for finding a defect or the like of the test object without erroneously recognizing noise as a defect or the like.

(3) Further, in the ultrasound flaw detector according to one aspect of the present disclosure, the first direction may have an angle of 5 degrees or more and 9 degrees or less.

The above configuration can suppress noise caused by surface wave generated at the interface between the test object and the liquid and noise caused by multiple reflection of ultrasound wave between the ultrasound probe and the test object, and can prevent an excessive decrease in intensity of the reception signal. Therefore, this configuration can enhance the S/N ratio of the reception signal.

(4) Further, in the ultrasound flaw detector according to one aspect of the present disclosure, the ultrasound signal processor may set a scanning range inside the test object as a relative position from the ultrasound probe, and specify a flaw of the test object present within the scanning range on the basis of a transmission time that is a propagation time of the ultrasound beam and a reception time that is a propagation time of the reflected ultrasound wave.

With the above configuration, it is possible to transmit/receive ultrasound waves and perform signal processing by combining any of transmit beamforming methods and any of receive beamforming methods.

(5) Further, in the ultrasound flaw detector according to one aspect of the present disclosure, the ultrasound signal processor may calculate a relative positional relation between a position within the scanning range and the surface of the test object on the basis of refractive indexes of the liquid and the test object.

With the above configuration, the position in the test object can be accurately obtained based on Snell's law.

(6) Further, in the ultrasound flaw detector according to one aspect of the present disclosure, the ultrasound signal processor may set the scanning range in a second direction with respect to the normal direction of the surface of the test object on the basis of refractive indexes of the liquid and the test object.

With the above configuration, the position in the test object can be accurately obtained based on Snell's law.

(7) Further, in the ultrasound flaw detector according to one aspect of the present disclosure, the ultrasound signal processor may set a second scanning range different from the scanning range in the test object, and the transmitter/receiver may transmit the ultrasound beam in a third direction with a second predetermined angle that is different from the predetermined angle with respect to the normal direction of the surface of the test object during transmission of the ultrasound beam to the second scanning range.

With the above configuration, the degree of inclination of the ultrasound beam can be changed according to the position in the test object.

(8) Further, in the ultrasound flaw detector according to one aspect of the present disclosure, the second scanning range may be located farther from the surface of the test object than the scanning range, and the second predetermined angle may be smaller than the predetermined angle.

With the above configuration, the intensity of the reception signal can be enhanced by increasing the degree of inclination of the ultrasound beam to avoid influence of surface waves for an area near the surface of the test object where the influence of surface waves is large, and by decreasing the degree of inclination of the ultrasound beam for the deep part of the test object where the influence of surface waves is small.

(9) Further, in the ultrasound flaw detector according to one aspect of the present disclosure, the holder may hold the ultrasound probe so that, when a direction perpendicular to the direction in which the transducers are arrayed on a transmission surface of the ultrasound probe is defined as a fourth direction, the fourth direction has the predetermined angle with respect to the surface of the test object.

With the above configuration, the inclination of the ultrasound beam can be set in a desired direction by inclining the short axis direction of the ultrasound probe.

(10) Further, in the ultrasound flaw detector according to one aspect of the present disclosure, the ultrasound probe is provided with transducers that are arrayed in a matrix, and when a direction where a smaller number of transducers are arrayed among the directions where the transducers are arrayed is defined as a fifth direction, the ultrasound probe may transmit the ultrasound beam so that the fifth direction has the predetermined angle with respect to the surface of the test object.

With the above configuration, the inclination of the ultrasound beam can be set to a desired direction without changing the direction of the ultrasound probe by steering processing in the short axis direction of the ultrasound probe.

The ultrasound flaw detector, the ultrasound flaw detection method, the program, and the non-transitory recording medium storing a computer readable program according to the present disclosure are useful for improving performance, particularly, improving resolution and S/N ratio, when non-destructive inspection is performed using an ultrasound probe provided with a transducer array.

Although an embodiment of the present invention has been described and illustrated in detail, the disclosed embodiment is made for purposes of illustration and example only and not limitation. The scope of the present invention should be interpreted by terms of the appended claims

What is claimed is:

1. An ultrasound flaw detector that determines a flaw in a test object in a liquid using an ultrasound probe, the ultrasound flaw detector comprising:
   an ultrasound probe that is provided with a plurality of transducers and that is held so that a direction in which the transducers are arrayed is parallel to a surface of the test object in a state where the plurality of transducers is located in the liquid;
   a hardware processor that, using the plurality of transducers, transmits an ultrasound beam in a first direction with a predetermined angle with respect to a normal direction of the surface of the test object and receives a reflected ultrasound wave reflected by the test object; and
   an ultrasound signal processor that specifies a flaw of the test object on the basis of a reception signal that has been generated by the hardware processor on the basis of the reflected ultrasound wave.

2. The ultrasound flaw detector according to claim 1, wherein the first direction is set so that an S/N ratio of the reception signal is 4 or more.

3. The ultrasound flaw detector according to claim 1, wherein the first direction has an angle of 5 degrees or more and 9 degrees or less.

4. The ultrasound flaw detector according to claim 1, wherein the ultrasound signal processor sets a scanning range inside the test object as a relative position from the ultrasound probe, and specifies a flaw of the test object present within the scanning range on the basis of a transmission time that is a propagation time of the ultrasound beam and a reception time that is a propagation time of the reflected ultrasound wave.

5. The ultrasound flaw detector according to claim 4, wherein the ultrasound signal processor calculates a relative positional relation between a position within the scanning range and the surface of the test object on the basis of refractive indexes of the liquid and the test object.

6. The ultrasound flaw detector according to claim 4, wherein the ultrasound signal processor sets the scanning range in a second direction with respect to the normal direction of the surface of the test object on the basis of refractive indexes of the liquid and the test object.

7. The ultrasound flaw detector according to claim 1, wherein
   the ultrasound signal processor sets a second scanning range different from the scanning range in the test object, and
   the hardware processor transmits the ultrasound beam in a third direction with a second predetermined angle that is different from the predetermined angle with respect to the normal direction of the surface of the test object during transmission of the ultrasound beam to the second scanning range.

8. The ultrasound flaw detector according to claim 7, wherein
   the second scanning range is located farther from the surface of the test object than the scanning range, and
   the second predetermined angle is smaller than the predetermined angle.

9. The ultrasound flaw detector according to claim 1, wherein the holder holds the ultrasound probe so that, when a direction perpendicular to the direction in which the transducers are arrayed on a transmission surface of the ultrasound probe is defined as a fourth direction, the fourth direction has the predetermined angle with respect to the surface of the test object.

10. The ultrasound flaw detector according to claim 1, wherein the ultrasound probe is provided with transducers that are arrayed in a matrix, and when a direction where a smaller number of transducers are arrayed among the directions where the transducers are arrayed is defined as a fifth direction, the ultrasound probe transmits the ultrasound beam so that the fifth direction has the predetermined angle with respect to the surface of the test object.

11. An ultrasound flaw detection method for determining a flaw in a test object in a liquid using an ultrasound probe, the method comprising:

holding the ultrasound probe provided with a plurality of transducers so that a direction in which the transducers are arrayed is parallel to a surface of the test object in a state where the plurality of transducers is located in the liquid;

transmitting an ultrasound beam in a first direction with a predetermined angle with respect to a normal direction of the surface of the test object and receiving a reflected ultrasound wave reflected by the test object, using the plurality of transducers;

generating a reception signal on the basis of the reflected ultrasound wave; and specifying a flaw of the test object on the basis of the reception signal.

12. A non-transitory recording medium storing a computer readable program causing a computer to perform ultrasound flaw detection processing for determining a flaw in a test object in a liquid using an ultrasound probe, the ultrasound probe being provided with a plurality of transducers and held so that a direction in which the transducers are arrayed is parallel to a surface of the test object in a state where the plurality of transducers is located in the liquid, the ultrasound flaw detection processing comprising:

transmitting an ultrasound beam in a first direction with a predetermined angle with respect to a normal direction of the surface of the test object and receiving a reflected ultrasound wave reflected by the test object, using the plurality of transducers;

generating a reception signal on the basis of the reflected ultrasound wave; and specifying a flaw of the test object on the basis of the reception signal.

* * * * *